US011161926B2

(12) United States Patent
Locklin et al.

(10) Patent No.: US 11,161,926 B2
(45) Date of Patent: Nov. 2, 2021

(54) SURFACES HAVING ANTIFOGGING CHARACTERISTICS, COATING COMPOSITIONS HAVING ANTIFOGGING CHARACTERISTICS, AND METHODS OF MAKING ANTIFOGGING SURFACES

(71) Applicant: University of Georgia Research Foundation, Inc., Athens, GA (US)

(72) Inventors: Jason J. Locklin, Bogart, GA (US); Qiaohong Liu, Athens, GA (US)

(73) Assignee: UNIVERSITY OF GEORGIA RESEARCH FOUNDATION, INC., Athens, GA (US)

(*) Notice: Subject to any disclaimer, the term of this patent is extended or adjusted under 35 U.S.C. 154(b) by 344 days.

(21) Appl. No.: 16/247,673

(22) Filed: Jan. 15, 2019

(65) Prior Publication Data
US 2019/0218327 A1 Jul. 18, 2019

Related U.S. Application Data

(60) Provisional application No. 62/617,418, filed on Jan. 15, 2018.

(51) Int. Cl.
*C08F 230/02* (2006.01)
*G02B 1/10* (2015.01)
*C09D 143/02* (2006.01)

(52) U.S. Cl.
CPC .......... *C08F 230/02* (2013.01); *C09D 143/02* (2013.01); *G02B 1/10* (2013.01)

(58) Field of Classification Search
CPC ........ C08F 230/02; G02B 1/10; C09D 143/02
USPC ....................................................... 428/500
See application file for complete search history.

(56) References Cited

U.S. PATENT DOCUMENTS

| 9,315,628 | B2 | 4/2016 | Locklin |
| 9,714,481 | B2 | 7/2017 | Locklin |
| 9,839,213 | B2 | 12/2017 | Locklin |
| 9,879,117 | B2 | 1/2018 | Locklin |
| 10,010,074 | B2 | 7/2018 | Locklin |
| 2011/0294384 | A1 | 12/2011 | Locklin |
| 2014/0127517 | A1 | 5/2014 | Locklin |
| 2014/0141230 | A1 | 5/2014 | Locklin |

FOREIGN PATENT DOCUMENTS

| CN | 105315400 | * | 1/2016 |
| JP | 2006104005 A | * | 4/2006 |
| WO | 2010096444 | | 1/2011 |
| WO | 2011139817 | | 4/2012 |
| WO | 2013012664 | | 4/2013 |
| WO | 2013012666 | | 6/2013 |
| WO | 2013019917 | | 6/2013 |
| WO | 2013056007 | | 7/2013 |

OTHER PUBLICATIONS

Gao et al., J. Mater. Chem. A., 4, 11719-11728, 2016. (Year: 2016).*
Translation of CN 105315400, Feb. 10, 2016. (Year: 2016).*
Translation of JP 2006-104005, Apr. 20, 2006. (Year: 2006).*
STIC search, Mar. 8, 2021. (Year: 2021).*
Zhao, J.; Meyer, A.; Ma, L.; Wang, X. J.; Ming, W. H., Terpolymer-based SIPN Coating With Excellent Antifogging and Frost-resisting Properties. RSC Adv. 2015, 5, 102560-102566.
Chevallier, P.; Turgeon, S.; Sarra-Bournet, C.; Turcotte, R.; Laroche, G., Characterization of Multilayer Anti-Fog Coatings. ACS Appl. Mater. Interfaces 2011, 3, 750-758.
Petit, J.; Bonaccurso, E., General Frost Growth Mechanism on Solid Substrates with Different Stiffness. Langmuir 2014, 30, 1160-1168.
Wang, Y.; Li, T. Q.; Li, S. H.; Sun, J. Q., Antifogging and Frost-Resisting Polyelectrolyte Coatings Capable of Healing Scratches and Restoring Transparency. Chem. Mater. 2015, 27, 8058-8065.
Howarter, J. A.; Youngblood, J. P., Self-Cleaning and Next Generation Anti-Fog Surfaces and Coatings. Macromol. Rapid Commun. 2008, 29, 455-466.
Watanabe, T.; Nakajima, A.; Wang, R.; Minabe, M.; Koizumi, S.; Fujishima, A.; Hashimato, K., Photocatalytic Activity and Photoinduced Hydrophilicity of Titanium Dioxide Coated Glass. 2nd International Conference on Coatings on Glass, Iccg 1999, 374-377.
Wang, R.; Hashimoto, K.; Fujishima, A.; Chikuni, M.; Kojima, E.; Kitamura, A.; Shimohigoshi, M.; Watanabe, T., Light-Induced Amphiphilic Surfaces. Nature 1997, 388, 431-432.
Fujishima, A.; Zhang, X. T.; Tryk, D. A., TiO2 Photocatalysis and Related Surface Phenomena. Surf. Sci. Rep. 2008, 63, 515-582.
Lai, Y. K.; Tang, Y. X.; Gong, J. J.; Gong, D. G.; Chi, L. F.; Lin, C. J.; Chen, Z., Transparent Superhydrophobic/Superhydrophilic TiO2-based Coatings for Self-cleaning and Anti-fogging. J. Mater. Chem. 2012, 22, 7420-7426.
Zhang, L. B.; Li, Y.; Sun, J. Q.; Shen, J. C., Mechanically Stable Antireflection and Antifogging Coatings Fabricated by the Layer-by-layer Deposition Process and Postcalcination. Langmuir 2008, 24, 10851-10857.
De Leon, A.; Advincula, R. C., Reversible Superhydrophilicity and Superhydrophobicity on a Lotus-Leaf Pattern. ACS Appl. Mater Interfaces 2014, 6, 22666-22672.
Raza, A.; Ding, B.; Zainab, G.; El-Newehy, M.; Al-Deyab, S. S.; Yu, J. Y., In situ Cross-linked Superwetting Nanofibrous Membranes for Ultrafast Oil-water Separation. J. Mater. Chem. A 2014, 2, 10137-10145.
Zhang, L.; Zhao, N.; Xu, J., Fabrication and Application of Superhydrophilic Surfaces: A Review. J. Adhes. Sci. Technol. 2014, 28, 769-790.
Liang, T.; Li, H.; Lai, X.; Su, X.; Zhang, L.; Zeng, X., A Facile Approach to UV-curable Super-hydrophilic Polyacrylate Coating Film Grafted on Glass Substrate. J. Coat. Technol. Res. 2016, 13, 1115-1121.
Ezzat, M.; Huang, C., Zwitterionic Polymerbrush Coatings with Excellent Anti-fog and Anti-frost Properties. RSC Adv. 2016, 6, 61695-61702.

(Continued)

*Primary Examiner* — Hui H Chin
(74) *Attorney, Agent, or Firm* — Thomas Horstemeyer, LLP

(57) ABSTRACT

Articles having anti-fogging characteristics, coating compositions providing anti-fogging characteristics, and methods for applying coating compositions with anti-fogging characteristics are described. The coating compositions give a surface or article an anti-fogging characteristic. Articles having such anti-fogging characteristics include those having optical clarity, such as eyewear.

9 Claims, 10 Drawing Sheets

(56) References Cited

OTHER PUBLICATIONS

Wolpers, A.; Vana, P., UV Light as External Switch and Boost of Molar-Mass Control in Iodine-Mediated Polymerization. Macromolecules 2014, 47, 954-963.
Ge, J. P.; Lee, H.; He, L.; Kim, J.; Lu, Z. D.; Kim, H.; Goebl, J.; Kwon, S.; Yin, Y. D., Magnetochromatic Microspheres: Rotating Photonic Crystals. J. Am. Chem. Soc. 2009, 131, 15687-15694.
Brown, P. S.; Atkinson, O. D.; Badyal, J. P., Ultrafast Oleophobic-hydrophilic Switching Surfaces for Antifogging, Self-cleaning, and Oil-water Separation. ACS Appl. Mater. Interfaces 2014, 6, 7504-11.
Hyomin Lee, M. L. A., Michael F. Rubner, Robert E. Cohen, Zwitter-Wettability and Antifogging Coatings with Frost-Resisting Capabilities. ACS Nano 2013, 7, 2172-2185.
Howarter, J. A.; Youngblood, J. P., Self-Cleaning and Anti-Fog Surfaces via Stimuli-Responsive Polymer Brushes. Adv. Mater. 2007, 19, 3838-3843.
Zhang, Z.; Chen, S. F.; Chang, Y.; Jiang, S. Y., Surface Grafted Sulfobetaine Polymers via Atom Transfer Radical Polymerization as Superlow Fouling Coatings. J. Phys. Chem. B 2006, 110, 10799-10804.
Liu, P. S.; Domingue, E.; Ayers, D. C.; Song, J., Modification of Ti6Al4V Substrates with Well-defined Zwitterionic Polysulfobetaine Brushes for Improved Surface Mineralization. ACS Appl. Mater. Interfaces 2014, 6, 7141-7152.
Singha, P.; Locklin, J.; Handa, H., A Review of The Recent Advances in Antimicrobial Coatings for Urinary Catheters. Acta Biomater 2017, 50, 20-40.
Li, C.; Li, X.; Tao, C.; Ren, L.; Zhao, Y.; Bai, S.; Yuan, X., Amphiphilic Antifogging/Anti-Icing Coatings Containing POSS-PDMAEMA-b-PSBMA. ACS Appl. Mater. Interfaces 2017, 9, 22959-22969.
Lin, X.; Fukazawa, K.; Ishihara, K., Photoreactive Polymers Bearing a Zwitterionic Phosphorylcholine Group for Surface Modification of Biomaterials. ACS Appl. Mater. Interfaces 2015, 7, 17489-98.
Ercole, F.; Davis, T. P.; Evans, R. A., Photo-responsive Systems and Biomaterials: Photochromic Polymers, Light-triggered Self-assembly, Surface Modification, Fluorescence Modulation and Beyond. Polym. Chem. 2010, 1, 37-54.
Dorman, G.; Prestwich, G. D., Benzophenone Photophores in Biochemistry. Biochemistry 1994, 33, 5661-5673.
Higuchi, H.; Yamashita, T.; Horie, K.; Mita, I., Photo-Cross-Linking Reaction of Benzophenone-Containing Polyimide and Its Model Compounds. Chem. Mater. 1991, 3, 188-194.
Toomey, R.; Freidank, D.; Ruhe, J., Swelling behavior of thin, surface-attached polymer networks. Macromolecules 2004, 37, 882-887.
Pahnke, J.; Ruhe, J., Attachment of Polymer Films to Aluminium Surfaces by Photochemically Active Monolayers of Phosphonic Acids. Macromol. Rapid Commun. 2004, 25, 1396-1401.
Shen, W. W.; Boxer, S. G.; Knoll, W.; Frank, C. W., Polymer-supported Lipid Bilayers on Benzophenone-modified Substrates. Biomacromolecules 2001, 2, 70-79.
Virkar, A.; Ling, M. M.; Locklin, J.; Bao, Z., Oligothiophene Based Organic Semiconductors with Cross-linkable Benzophenone Moieties. Synth. Met. 2008, 158, 958-963.
Samuel, J. D. J. S.; Brenner, T.; Prucker, O.; Grumann, M.; Ducree, J.; Zengerle, R.; Ruhe, J., Tailormade Microfluidic Devices Through Photochemical Surface Modification. Macromol. Chem. Phys. 2010, 211, 195-203.
Hu, S. W.; Ren, X. Q.; Bachman, M.; Sims, C. E.; Li, G. P.; Allbritton, N. L., Surface-directed, Graft Polymerization within Microfluidic Channels Anal Chem. 2004, 76, 1865-1870.
Prucker, O.; Brandstetter, T.; Ruhe, J., Surface-attached Hydrogel Coatings via C,H-insertion Crosslinking for Biomedical and Bioanalytical Applications (Review). Biointerphases 2018, 13.
Abu-Rabeah, K.; Atias, D.; Herrmann, S.; Frenkel, J.; Tavor, D.; Cosnier, S.; Marks, R. S., Characterization of Electrogenerated Polypyrrole-Benzophenone Films Coated on Poly(pyrrole-methyl metacrylate) Optic-Conductive Fibers. Langmuir 2009, 25, 10384-10389.
Brandstetter, T.; Bohmer, S.; Prucker, O.; Bisse, E.; zur Hausen, A.; Alt-Morbe, J.; Ruhe, J., A Polymer-based DNA Biochip Platform for Human Papilloma Virus Genotyping. J. Virol. Methods 2010, 163, 40-48.
Yatvin, J.; Gao, J.; Locklin, J., Durable Defense: Robust and Varied Attachment of Non-leaching Poly"-onium" Bactericidal Coatings to Reactive and Inert Surfaces. Chem. Commun. 2014, 50, 9433-9442.
Gao, J.; Martin, A.; Yatvin, J.; White, E.; Locklin, J., Permanently Grafted Icephobic Nanocomposites with High Abrasion Resistance. J Mater. Chem. A 2016, 4, 11719-11728.
Liu, Q. H.; Singha, P.; Handa, H.; Locklin, J., Covalent Grafting of Antifouling Phosphorylcholine-Based Copolymers with Antimicrobial Nitric Oxide Releasing Polymers to Enhance Infection-Resistant Properties of Medical Device Coatings. Langmuir 2017, 33, 13105-13113.
Stephens, E. R.; Rodney, W. S., Refractive Indices of Five Selected Optical Glasses. J. Res. Natl. Bur. Stand. 1954, 52, 303-304.
Raut, H. K.; Ganesh, V. A.; Nair, A. S.; Ramakrishna, S., Anti-reflective Coatings: A Critical, In-depth Review. Energ Environ. Sci. 2011, 4, 3779-3804.
Zhao, J.; Ma, L.; Millians, W.; Wu, T. E. H.; Ming, W. H., Dual-Functional Antifogging/Antimicrobial Polymer Coating. ACS Appl. Mater. Inter. 2016, 8, 8737-8742.
Zhang, T.; Yu, Q. Y.; Wang, J. J.; Wu, T., Design and Fabrication of a Renewable and Highly Transparent Multilayer Coating on Poly(lactic acid) Film Capable of UV-Shielding and Antifogging. Ind. Eng. Chem. Res. 2018, 57, 4577-4584.
Liu, K. S.; Yao, X.; Jiang, L., Recent Developments in Bio-inspired Special Wettability. Chem. Soc. Rev. 2010, 39, 3240-3255.
Ganesh, V. A.; Raut, H. K.; Nair, A. S.; Ramakrishna, S., A Review on Self-cleaning Coatings. J. Mater. Chem. 2011, 21, 16304-16322.
Amoako Kagya A. et al.: "Multimodal, Biomaterial-Focused Anticoagulation via Superlow Fouling Zwitterionic Functional Groups Coupled with Anti-Platelet Nitric Oxide Release", Advanced Materials Interfaces, vol. 3, No. 6, Mar. 1, 2016 (Mar. 1, 2016), p. 1500646, XP055808058.
Vasilis G Gavalas et al: "Enhancing the blood compatibility of ionselective electrodes", Analytical and Bioanalytical Chemistry, Springer, Berlin, DE, vol. 384, No. 1, Jan. 1, 2006 (Jan. 1, 2006), pp. 65-72, XP019327763.
Marcus J. Goudie et al: "Liquid-infused nitric oxide-releasing (LINORel) silicone for decreased fouling, thrombosis, and infection of medical devices", Scientific Reports, vol. 7, No. 1, Jan. 1, 2017 (Jan. 1, 2017), XP055509330.

\* cited by examiner

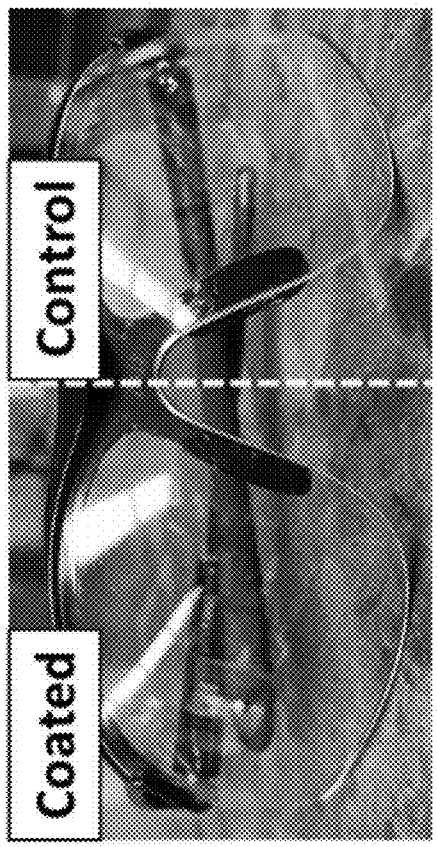
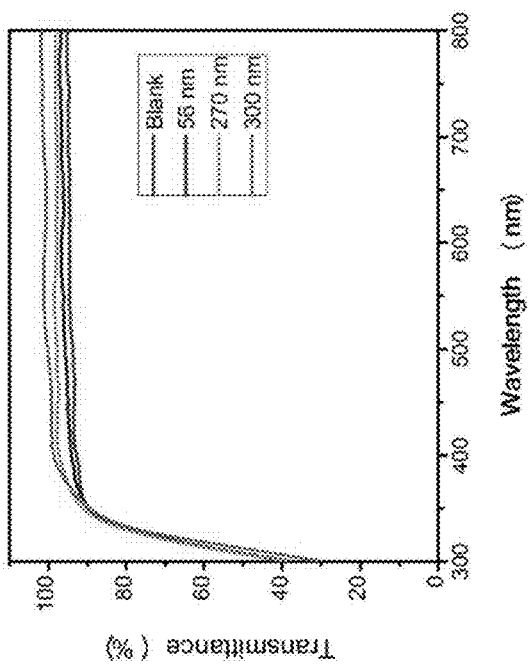
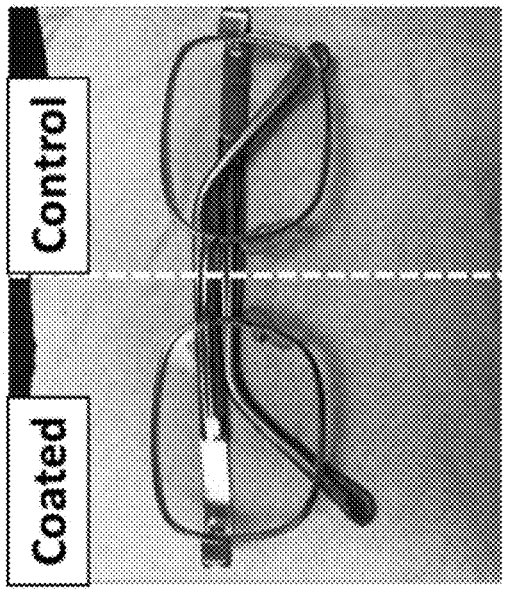
Fig. 1B
Fig. 1C
Fig. 1D

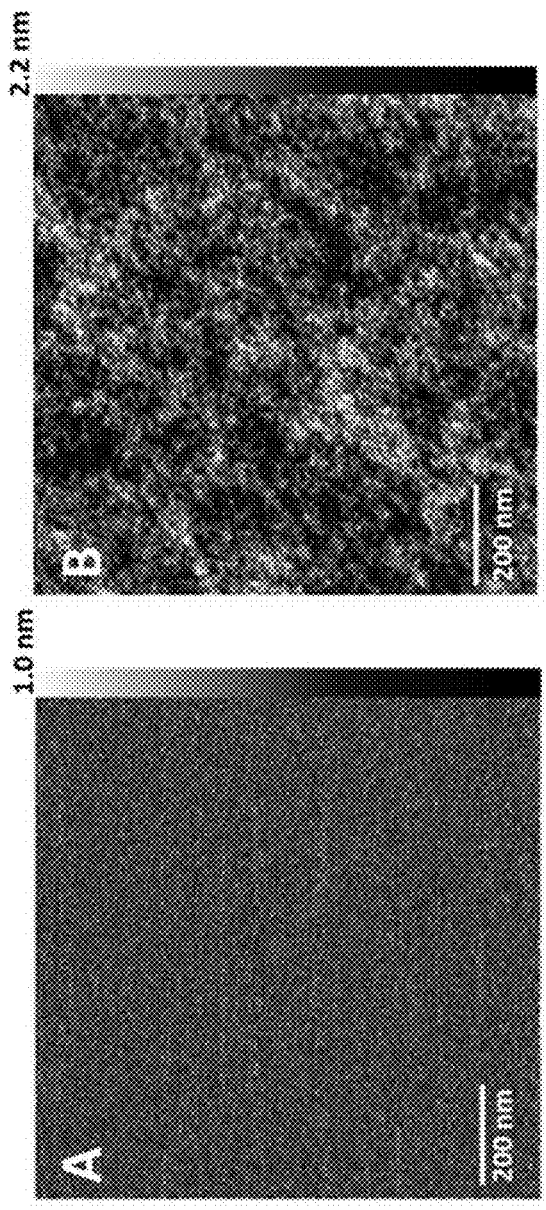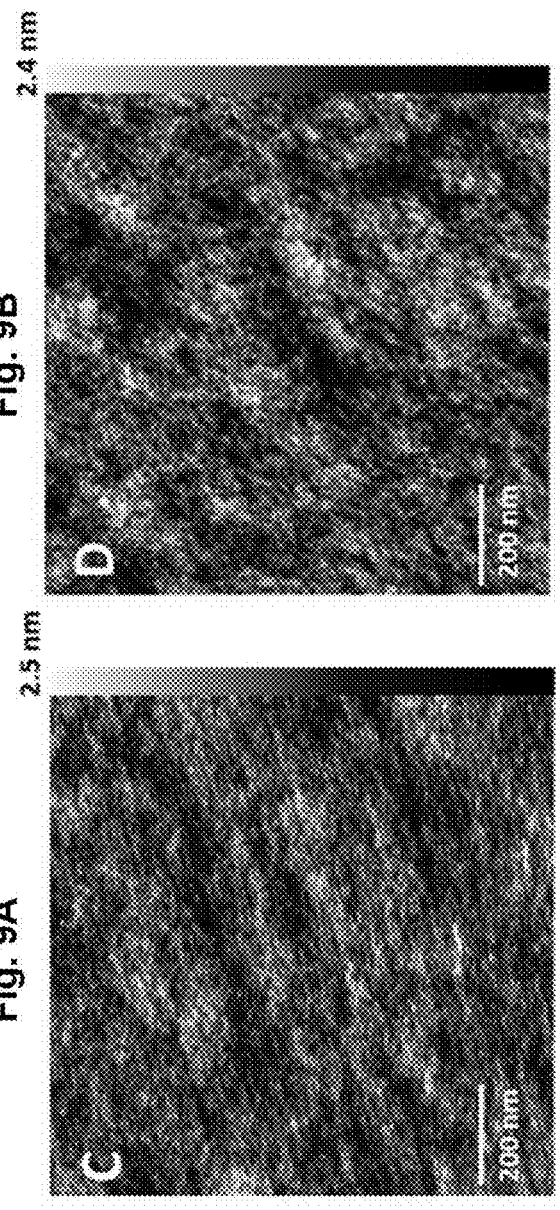
Fig. 9A  Fig. 9B  Fig. 9C  Fig. 9D

SURFACES HAVING ANTIFOGGING CHARACTERISTICS, COATING COMPOSITIONS HAVING ANTIFOGGING CHARACTERISTICS, AND METHODS OF MAKING ANTIFOGGING SURFACES

CROSS-REFERENCE TO RELATED APPLICATIONS

This application claims the benefit of and priority to U.S. Provisional Application Ser. No. 62/617,418, having the title "SURFACES HAVING ANTIFOGGING AND ANTI-FOULING CHARACTERISTICS, COATING COMPOSITIONS HAVING ANTIFOGGING AND ANTIFOULING CHARACTERISTICS, AND METHODS OF MAKING ANTIFOGGING AND ANTIFOULING SURFACES", filed on Jan. 15, 2018, the disclosure of which is incorporated herein by reference in its entirety.

BACKGROUND

Formation of fog due to water vapor condensation on a surface as a result of a temporary change in temperature and humidity leads to many problems in practical applications, including windshields, eyeglasses, safety glasses and optical instruments.[1-5] To alleviate fog formation, there are three general strategies used to prepare antifogging films, each with its own advantages and disadvantages. One conventional approach uses photo-active inorganic nanoparticles such as $TiO_2$ and ZnO that become super-hydrophilic under ultraviolet (UV) light exposure.[6-9] Others include different fabrication methods such as layer-by-layer assembly or electrostatic spinning, which aim to modify the chemical environment and geometric microstructure of the surface into a nonporous or textured film, which will absorb water and facilitate the spread of water on the surface.[10-13] Both of these approaches described above require multiple steps, harsh reactants, and/or post treatments, all of which can limit practical application in everyday use.[14-15] A third approach, which involves simple deposition of hydrophilic polymer coatings on to various substrates, is a very promising candidate that provides a low cost and simple process, with high efficiency.[16-17] Nevertheless, the preparation of highly transparent and robust superhydrophilic polymer coatings still remained a challenge. For instance, there are reports of obtaining superhydrophilic coatings using spin coating,[2,18] layer-by-layer assembly[19] and polymer bush[15.20]. However, all these methods are difficult for commercial application.

Zwitterionic polymers have attracted attention due to their strong hydration capacity and have been widely used as biomimetic antifouling materials in marine and biomedical applications.[15, 21-22] The dipole arrangement of the water molecule in the hydration shell formed via electrostatic interactions with the charged groups of the zwitterion are close to that of free water. Therefore, adsorbed water can create a continuous or near-continuous film, minimizing scattering events and preserving the optical transmission of the substrate.[19,23] However, due to the high solubility of the zwitterionic polymers, these coatings are easily delaminated or dissolved in the presence of water, which is a limitation of this approach.[14] To permanently attached zwitterionic polymers thin films to a substrate, there are several reports utilizing layer by layer methods or polymer brush techniques,[15, 19-20, 24] but these still have many challenges in translation from small laboratory substrates to scale mass production. However, coatings that grafting through either chemical or photochemical crosslinking are considered to be an effective and reasonable method for modifying polymer materials on substrates through covalent binding.[25-26]

SUMMARY

Embodiments of the present disclosure provide for surfaces having anti-fogging characteristics, compositions having anti-fogging characteristics, methods of applying compositions having anti-fogging characteristics, and the like.

An embodiment of the present disclosure includes articles having a transparent surface, which can include a film disposed on the surface. The film gives the surface an anti-fogging characteristic. The film can include a polymer having the following structure:

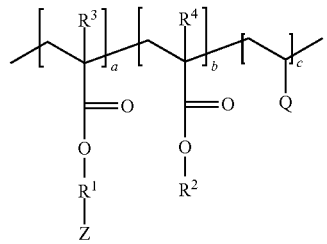

where each occurrence of Z is a zwitterionic moiety; where Q is selected from a photo cross-linkable moiety, a cross-linked photo cross-linkable moiety, or a combination of the photo cross-linkable moiety and the cross-linked photo cross-linkable moiety are present in the polymer, where a first portion of Q is the photo cross-linkable moiety and a second portion of Q is the cross-linked photo cross-linkable moiety, wherein the first portion is 0% to less than 100%, wherein the second portion is greater than 0% and up to 100%; where each occurrence of $R^1$ is independently a covalent bond or a linear or branched, substituted or unsubstituted alkyl diradical having from 1 to 12 carbon atoms; where each occurrence of $R^2$, $R^3$, and $R^4$ is independently a linear or branched, substituted or unsubstituted alkyl having from 1 to 12 carbon atoms; and where a, b, and c are real numbers such that $0<a<1$, $0\le b<1$, $0<c<1$, and $a+b+c=1$. The polymer can be covalently attached to the surface through the second portion of the cross-linked photo cross-linkable moiety.

An embodiment of the present disclosure also includes methods of applying coating compositions to a transparent surface or an article, wherein the coating composition gives the surface an anti-fogging characteristic. The coating composition can have the structure:

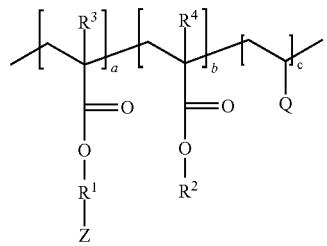

where each occurrence of Z is a zwitterionic moiety; where Q is selected from a photo cross-linkable moiety, a cross-linked photo cross-linkable moiety, or a combination of the photo cross-linkable moiety and the cross-linked photo cross-linkable moiety are present in the polymer, where a first portion of Q is the photo cross-linkable moiety and a second portion of Q is the cross-linked photo cross-linkable moiety, wherein the first portion is 0% to less than 100%, wherein the second portion is greater than 0% and up to 100%; where each occurrence of $R^1$ is independently a covalent bond or a linear or branched, substituted or unsubstituted alkyl diradical having from 1 to 12 carbon atoms; where each occurrence of $R^2$, $R^3$, and $R^4$ is independently a linear or branched, substituted or unsubstituted alkyl having from 1 to 12 carbon atoms; and where a, b, and c are real numbers such that $0<a<1$, $0\leq b<1$, $0<c<1$, and $a+b+c=1$. The surface can be exposed to light energy, so that upon exposure, the coating composition covalently attaches to the surface through a cross-linked photo cross-linkable moiety.

An embodiment of the present disclosure also includes coating compositions that include a polymer having a hydrophilic moiety and a photo cross-linkable moiety.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1B provides an example of UV-vis spectra of bare glass and BPMPC polymer modified glass with different coating thickness.

FIG. 1C is an optical photograph of an example of BPMPC coated (left side) and bare (right side) safety glasses according to the present disclosure.

FIG. 1D is an optical photograph of an example of BPMPC coated (left side) and bare (right side) eyeglasses according to the present disclosure.

FIG. 2A is a control (uncoated), FIG. 2B is an example of an iBTS modified slide, and FIG. 2C is an example of a BPMPC functionalized slide.

FIG. 4A is a control, while FIG. 4B is coated with a BPMPC functionalized layer.

(FIG. 7C) Photograph of eyeglasses after cleaning with Expo on hot water, BPMPC coated (left) and control (right).

FIGS. 9A-9D are AFM topography images of (FIG. 9A) bare glass, (FIG. 9B) 60 nm, (FIG. 9C) 250 nm and (FIG. 9D) 300 nm BPMPC coatings.

DETAILED DESCRIPTION

Figure 1A:
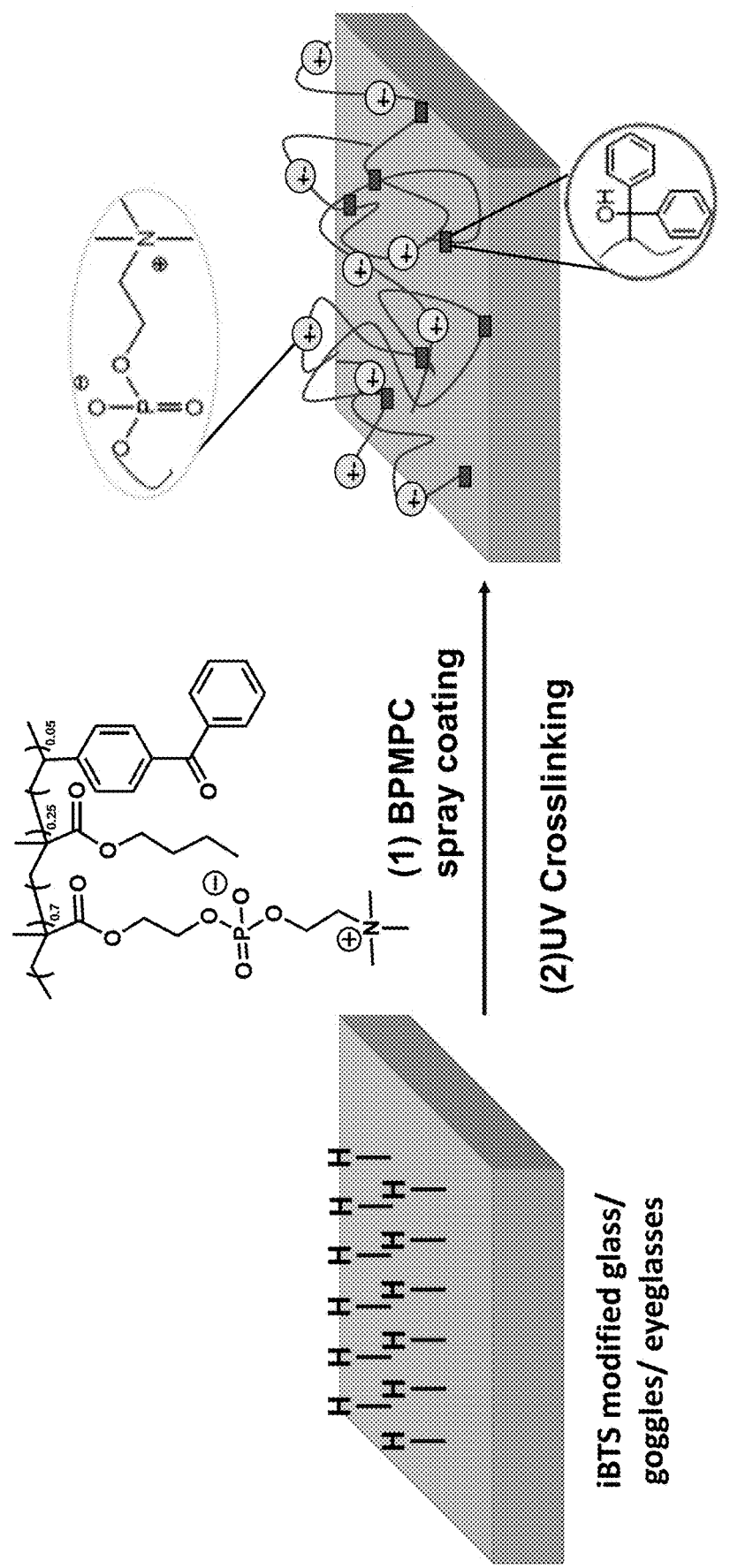
FIG. 1A is an example schematic for BPMPC crosslink to a C—H containing surface under UV irradiation.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the compositions and methods disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible. It must be noted that, as used in the specification and the appended claims, the singular forms "a," "an," and "the" include plural referents unless the context clearly dictates otherwise.

Abbreviations: nBMA, n-butyl methacrylate; MPC, 2-Methacryloyloxyethyl phosphorylcholine; iBTS, isobutyl-trichlorosilane; BPMPC, 2-methacryloyloxyethyl phosphorylcholine-co-butyl methacrylate-co-benzophenone; BP, 4-vinylbenzophenone Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

The term "alkyl" as used herein refers to straight chained and branched saturated hydrocarbon groups containing one to thirty carbon atoms, for example, one to twenty carbon atoms, or one to ten carbon atoms. When used in association with the term $C_n$ it means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

General Discussion

In accordance with the purpose(s) of the present disclosure, as embodied and broadly described herein, embodiments of the present disclosure, in some aspects, relate to surfaces having anti-fogging characteristics, coating compositions having anti-fogging characteristics, methods of applying anti-fog coating compositions to a surface and products including anti-fogging surfaces.

In general, embodiments of the present disclosure provide for surfaces having anti-fogging characteristics, coating compositions having anti-fogging characteristics, methods of applying anti-fog coating compositions to a surface and products including anti-fogging surfaces. Advantageously, the coating composition has antifogging characteristics such that condensation, fog, and frost accumulation on a surface in either hot or cold humid conditions are prevented or substantially reduced.

The present disclosure includes articles having a surface that has antifogging characteristics. The antifogging characteristics are the result of forming a film on the surface of the article. As used herein, the antifogging characteristics of the surface prevent or substantially reduce (e.g., about 80-99%, about 85 to 99%, about 90 to 99%, about 95 to 99%) condensation, fog, and frost accumulation on a surface in either hot or cold humid conditions relative to the surface without these antifogging characteristics. The surface can be substantially transparent (e.g. allows light to pass through so that objects behind the surface can be distinctly seen). In various embodiments, the surface has substantial optical clarity, such that no visible distortion or refraction is detectable to the naked eye of a human when looking through the surface.

In various embodiments the surface is a lens, such as an optical lens on articles (e.g. eyeglasses, sunglasses, goggles, or other eyewear). In other embodiments, the surface/article can be windshields, windows, appliances, vehicles, cameras, surgical sights and scopes, weaponry sights and scopes, telescopes, binoculars, glassware, mirrors, devices screens, or other surfaces that accumulate condensation, fog, or frost when exposed to rapid temperature changes or humid conditions. Advantageously, the antifogging characteristics can be applied to surfaces on articles that are exposed to rapid changes in temperature or environment (e.g. eyewear) where solutions such as double-wall insulation cannot be used. The antifogging characteristics provided by embodiments of the present disclosure are also permanent or semi-permanent (e.g., can be used for extended periods of time (e.g., months to years)) and will withstand washing, unlike solutions such as surfactants that are applied to repel moisture.

In an aspect, the film formed on the surface of the article can be produced by applying a coating composition (e.g. a polymer) to the surface and then exposing the article to light energy to form the film. In an aspect the film is about 1 nm to 1 mm thick or optionally more.

In an aspect, the coating composition includes a polymer having a hydrophilic moiety and a photo cross-linkable moiety. In an aspect, the polymer can be covalently attached (e.g. with a C—C bond) to the surface through a cross-linked photo cross-linkable moiety to form the film on the surface upon exposure to light energy (e.g., ultraviolet energy).

In some embodiments, the polymer (also referred to as a "zwitterionic polymer") is a copolymer comprising zwitterionic repeat units and tethering repeat units. After exposure of the polymer to light energy, the tethering repeat units (e.g., specifically the photo cross-linkable moiety that reacts to form the cross-linked photo cross-linkable moiety) include covalent bonds (e.g. C—C bond) to the at least one surface. For instance, the polymer (prior to being exposed to light energy) can be a copolymer (e.g., a random copolymer) having a structure according to the following formula:

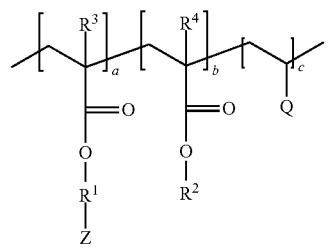

Each occurrence of Z is a zwitterionic moiety, which can include phosphate betaine, carboxybetaine, and sulfobetaine. Q is a photo cross-linkable moiety. It should be noted that after exposure to light energy, Q can be the photo cross-linkable moiety, a cross-linked photo cross-linkable moiety or a combination of the photo cross-linkable moiety and the cross-linked photo cross-linkable moiety are present in the polymer, where a first portion of Q is the photo cross-linkable moiety and a second portion of Q is the cross-linked photo cross-linkable moiety. The first portion is 0% to less than 100%, wherein the second portion is greater than 0% and up to 100%. In other words, some of Q will react to form a C—C bond to a surface to form the film while some of Q will not. The film will likely include a polymer having a mixture of reacted and unreacted Q moieties.

Each occurrence of R1 is independently a covalent bond or a linear or branched, substituted or unsubstituted alkyl diradical having from 1 to 12 carbon atoms. Each occurrence of R2, R3, and R4 is independently a linear or branched, substituted or unsubstituted alkyl having from 1 to 12 carbon atoms. Subscripts a, b, and c are real numbers such that 0<a<1, 0≤b<1, 0<c<1, and a+b+c=1.

In an embodiment, the hydrophilic moiety (the unit including Z) functions to provide at least a hydrophilic characteristic to the coating composition. Embodiments of the present disclosure include a polymer, where the hydrophilic moiety can be comprised of side chain components (e.g. polyethyleneglycol methacrylate, hydroxyethyl methacrylate) and a zwitterionic moiety. In various embodiments, the hydrophilic moiety can include a C1-C8-alkyl methacrylate (or C1-C8-alkyl acrylate) such as iso-butyl methacrylate in addition to the zwitterionic moiety.

In an embodiment, the photo cross-linkable moiety, Q, prior to exposure to light energy can include an aryl ketone (about 340 to 400 nm), an aryl azide group (about 250 to 450 nm or about 350 to 375 nm), a diazirine group (about 340 to 375 nm), and the polymer can include a combination of these groups. In an embodiment, the photo cross-linkable moiety can include alkyl-arylketones and diarylketones bearing at least one condensed ring system substituent such as naphtyl and anthracenyl. In an embodiment, the aryl ketone group can include benzophenone (about 340 to 380 nm), acetophenone (about 340 to 400 nm), a naphthylmethylketone (about 320 to 380 nm), a dinaphthylketone (about 310 to 380 nm), a dinaphtylketone derivative (about 320 to 420 nm), or derivatives of each of these. In an embodiment, the photo cross-linkable moiety is a benzophenone group. In an embodiment, the aryl azide group can include phenyl azide, alkyl substituted phenyl azide, halogen substituted phenyl azide, or derivatives of each of these. In an embodiment, the diazirine group can include 3,3 dialkyl diazirine (e.g., 3,3 dimethyl diazirine, 3,3 diethyl diazirine), 3,3 diaryl diazirine (e.g., 3,3 diphenyl diazirine), 3-alkyl 3-aryl diazirine, (e.g., 3-methyl-3-phenyl diazirine), or derivatives of each of these. Upon exposure to light energy, the photo cross-linkable moiety can react to form a C—C bond with the surface and the reacted moiety is referred to as the cross-linked photo cross-linkable moiety, where each structure will change to accommodate the formation of the C—C bond. As noted above in reference to Q, some of the photo cross-linkable moieties will react to form a C—C bond to the surface will some may not. In an embodiment, substantially all of photo cross-linkable moiety will react to from C—C bonds to the surface.

The zwitterionic polymer can be 2-methacryloyloxyethyl phosphorylcholine-co-butyl methacrylate-co-benzophenone (BPMPC), sulfobetaine methacrylate (SBMA)-co-butyl methacrylate-co-benzophenone, or a carboxybetaine methacrylate (CBMA)-co-butyl methacrylate-co-benzophenone copolymers. The zwitterionic polymer can be from about 20% to about 99% zwitterionic moiety. In an aspect, the BPMPC can be from about 20% to about 99% 2-methacryloyloxyethyl phosphorylcholine (MPC), (e.g. 30% MPC, SBMA, or CBMA, 50% MPC, SBMA, or CBMA, 70% MPC, SBMA, or CBMA or 90% MPC, SBMA, or CBMA)).

In an embodiment the polymer can be represented by one or more of the following polymers:

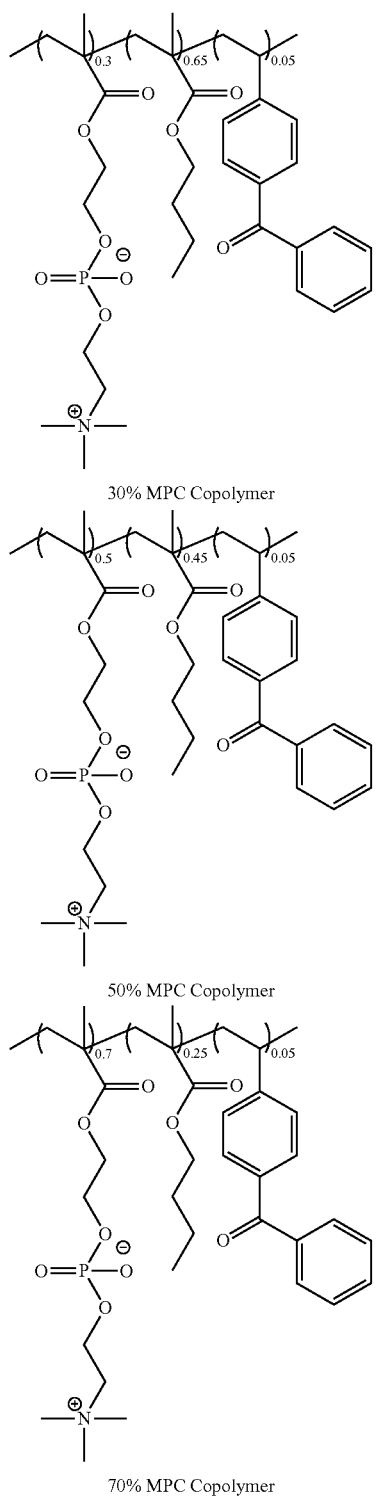

30% MPC Copolymer

50% MPC Copolymer

70% MPC Copolymer

-continued

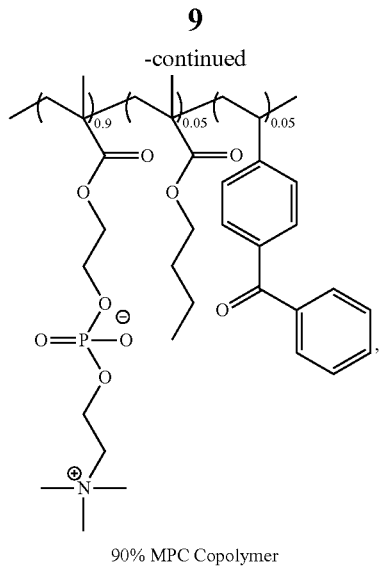

90% MPC Copolymer where the ratio of the components can vary from those described above, where each subscript can vary from 0.05 to 0.9.

Embodiments of the present disclosure include a surface as above, where the photo cross-linkable moiety can be benzophenone prior to reaction. After reaction, some or all of the photo cross-linkable moiety react to form C—C bonds to the surface via the cross-linked photo cross-linkable moiety. Hydrophilic polymers can be used as coating materials for the preparation of superhydrophilic surfaces. The ability of an aryl ketone moiety such as benzophenone (BP) to act as a cross-linking agent and abstract hydrogen from a suitable hydrogen donor has been well studied and utilized in various chemical systems for many years.[5-7] BP can be used for crosslinking organic thin films and it can be activated using mild UV light (345-365 nm), avoiding oxidative damage of the polymer and surface that can occur upon exposure to higher energy UV. The benzophenone moiety is more chemically robust than other organic cross-linkers and reacts preferentially with C—H bonds in a wide range of different chemical environments. Triggered by UV light, benzophenone undergoes an n-π* transition, resulting in the formation of a biradical triplet excited state that can abstract a hydrogen atom from a neighboring aliphatic C—H group to form a new C—C bond. This triplet state also has especially high reactivity for H located alpha to electron donating heteroatoms (nitrogen and oxygen). This photoreaction has recently been used to attach thin polymer layers to metal and oxide surfaces,[8-11] along with applications in microfluidics,[12] organic semiconductors,[13] and biosensors.[14].

In a particular embodiment, the polymer (as shown below) can be a copolymer comprising zwitterionic repeat units (the unit including Z) and tethering repeat units, and the tethering repeat units include covalent bonds (C—C) to the at least one surface using the cross linked benzophenone (e.g., the cross-linked photo cross-linkable moiety). For instance, the zwitterionic polymer can be a random copolymer having a structure according to the following formula:

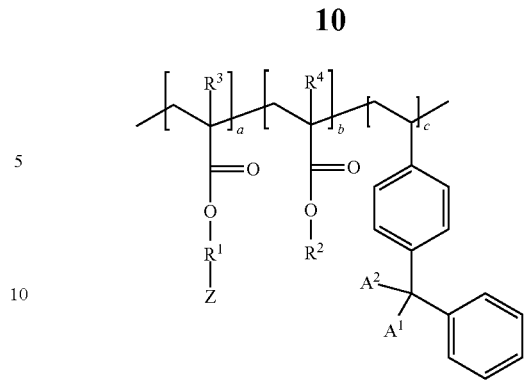

For reference, when the photo cross linkable moiety is benzophenone, prior to exposure to light energy, $A^1$ is not present and $A^2$ is =O. After exposure to light energy, a portion of the cross-linked photo cross linkable moieties of the polymer have $A^1$ as a covalent bond (C—C) to the at least one surface and $A^2$ is —OH. As described above and shown in the structure above, after exposure to light energy a portion of the photo cross linkable moieties of the polymer will not react ($A^1$ is not present and $A^2$ is =O) and other portions will react ($A^1$ as a covalent bond (C—C) to the at least one surface and $A^2$ is —OH).

Each occurrence of Z is a zwitterionic moiety. Each occurrence of $R^1$ is independently a covalent bond or a linear or branched, substituted or unsubstituted alkyl diradical having from 1 to 12 carbon atoms; where each occurrence of $R^2$, $R^3$, and $R^4$ is independently a linear or branched, substituted or unsubstituted alkyl having from 1 to 12 carbon atoms; and where a, b, and c are real number such that $0<a<1$, $0 \leq b<1$, $0<c<1$, and $a+b+c=1$.

The present disclosure also includes methods of applying the coating composition to an article. The method includes applying a coating composition to a surface. The coating composition includes the polymer having the hydrophilic moiety and the photo cross-linkable moiety, and exposing the surface to light energy (e.g., ultraviolet energy), where the polymer covalently attaches to the surface through the cross-linked photo cross-linkable moiety upon exposure to the light energy.

Embodiments of the present disclosure can include a method as above, where the application of the coating composition to the article can be accomplished via spray coating, dip coating, pad application, and films with adhesive backing.

Embodiments of the present disclosure include a method as above, where the method includes exposing the coating composition to ultraviolet light to covalently attach the coating composition to the article.

The present disclosure also includes articles having a surface including the coating composition (e.g. a film). The coating composition gives the surface an anti-fogging characteristic after exposure to light energy and includes the polymer having the hydrophilic moiety and the cross-linked photo cross-linkable moiety, where the polymer is covalently attached to the surface through the cross-linked photo cross-linkable moiety to form a film on the surface.

Embodiments of the present disclosure include a surface as above, where the photo cross-linkable moiety is benzophenone (or a cross-linked moiety thereof). Embodiments of the present disclosure include a surface as above, where the hydrophilic moiety is a zwitterionic polymer. Embodiments of the present disclosure include a surface as above, where the polymer is 2-methacryloyloxyethyl phosphorylcholine-co-butyl methacrylate-co-benzophenone (BPMPC), isobutyl methacrylate.

Embodiments of the present disclosure include a surface as above, where the film has substantial optical clarity such that the surface is transparent and no visible distortion or refraction is detectable to the naked eye. Embodiments of the present disclosure include a surface as above, where the article is an optical lens. In other words, the film can be disposed on glasses worn by a person, where the lens have an antifogging characteristic.

In various embodiments the article having a transparent surface having film disposed thereon can be a lens, such as an optical lens on articles (e.g. eyeglasses, sunglasses, goggles, or other eyewear). In other embodiments, the article can be windshields, windows, appliances, vehicles, cameras, surgical sights and scopes, weaponry sights and scopes, telescopes, binoculars, glassware, mirrors, or other surfaces that accumulate condensation, fog, or frost when exposed to rapid temperature changes or humid conditions. In various aspects, the surface can be glass, polymer, coated, or uncoated. Advantageously, the antifogging characteristics can be applied to surfaces on articles that are exposed to rapid changes in temperature or environment (e.g. eyewear) where solutions such as double-wall insulation cannot be used. The antifogging characteristics provided by embodiments of the present disclosure are also permanent and will withstand washing, unlike solutions such as surfactants that are applied to repel moisture.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

The ability of benzophenone (BP) to act as a cross-linking agent and abstract hydrogen from a suitable hydrogen donor has been well studied and utilized in various chemical systems for many years.[27-28] BP is an ideal choice for crosslinking organic thin films, because it can be activated using mild UV light (345-365 nm), avoiding oxidative damage to either the polymer or substrate that can occur upon exposure to higher energy UV. The BP moiety is more chemically robust than other organic cross-linkers and reacts preferentially with C—H bonds in a wide range of different chemical environments. When irradiated with UV light, an electron from the n-orbital on the carbonyl of BP is exited to $\pi^*$-orbital to a biradical triplet excited state that can abstract a hydrogen atom from a neighboring aliphatic C—H bonds to form a new C—C bond. This triplet state also has unusually high reactivity for H atoms located alpha to electron donating heteroatoms (nitrogen and oxygen). This photoreaction has recently been used to attach thin polymer layers to metal and oxide surfaces,[29-31] along with applications ranging from organic semiconductors,[32] microfluidic devices,[33-34] hydrogel[29,35], and biosensors.[36-37] Because of these advantages, we have previously developed antimicrobial copolymers containing hydrophobic N-alkyl and benzophenone moiety on a polyethylenimine backbone,[38] anti-icing copolymers consisting hexafluorobutyl, benzophenone, and nanoparticles,[39] and antifouling copolymers containing zwitterionic monomers and benzophenone.[40] All of these systems exhibit fast crosslinking kinetics and high abrasion resistance.

In the study described herein, a zwitterionic terpolymer (2-methacryloyloxyethyl phosphorylcholine-co-butyl methacrylate-co-benzophenone, BPMPC) was synthesized and covalently grafted to alkyl-modified glass and plastic lenses with UV irradiation. After the coatings are applied, the transmittance of the substrates is well maintained regardless of coating thickness, which ranges from 50 to 300 nm. These BPMPC polymer coatings exhibit excellent antifogging properties in hot-vapor and freeze-warm tests. Moreover, the self-cleaning properties were evaluated, and the results showed that the modified surface could be cleaned by a simple water rinse without surfactant or harsh abrasion. Additionally, BPMPC coating exhibited high chemical stability against household detergent and mechanical durability against abrasion with paper and cloth.

Experiment Section

Materials. 2-Methacryloyloxyethyl phosphorylcholine (MPC) and Disperse Red 1 were purchased from Sigma Aldrich (St. Louis, Mo.). 2,2'-azobis(2-methylpropiontirlemethylpropionitrile) (AIBN) and n-butyl methacrylate (nBMA) were purchased from Alfa-Aesar. Isobutyl-trichlorosilane (iBTS) was purchased from Tokyo Chemical Industry. Tetradecane and glass slides were purchased from Fisher-Scientific. Toluidine Blue O was obtained from EMD Chemical. Iron metal powder was obtained from VWR. 4-vinylbenzophenone (BP) was synthesized according to a previously reported procedure from our group[39]. De-ionized (DI) water (18.2 MΩ) was used for all the aqueous solution. Nitrogen gas was purchased from Airgas. All the chemicals were used as received without further purification.

Substrate Preparation and Crosslinking. The polymer was synthesized according to our previous report[40]. Glass substrates were sonicated with deionized water, hexane, isopropanol, and acetone for 5 minutes each then dried under nitrogen, followed by plasma (Harrick Plasma PDC-32G) cleaning treated with iBTS in toluene (10 mmol) overnight before modification with the polymer. Polycarbonate safety glasses and eyeglasses were cleaned with DI water and ethanol then dried in air.

Spray coating was used to apply the coatings. A BPMPC/ethanol solution (2 mg mL$^{-1}$) was sprayed using an airbrush (Model S 62, Master Airbrush) from a distance of 10 cm onto substrates held vertically to achieve uniform coating upon drying. 1 mL solution was used for glass slides and 3 mL solution was used for eyeglasses and safety glasses. Then the glass substrates were irradiated with UV light (UVP, 254 nm, 6.5 mW cm$^{-2}$) for 1 min to covalently bond the BPMPC to the surface. BPMPC modified goggle and eyeglasses coated in a similar fashion before placing on a UV Crosslinker (FB-UVXL-1000, Fisher Scientific, 254 nm, 2 mW cm$^{-2}$) for 3 min. The substrates were rinsed with sufficient ethanol to remove unattached BPMPC then dried under nitrogen.

Characterization of the polymer coatings. According to previous study, UV-vis spectra indicated that the crosslinking occurs with rapid kinetics, and only a few seconds are needed to covalently bond BPMPC to the underlying substrates. Additionally, the reduction of C=O stretch of BP in FTIR further confirmed the crosslinking reaction.[40] The surface wettability on glass slides was characterized by measuring the static water contact angle using a DSA 100 drop shape analysis system (KRÜSS) with a computer-controlled liquid dispensing system. 1 μL DI water droplets were deposited onto substrate, and the water contact angles were measured within 10 seconds through the analysis of photographic images.

The transmission of the coated substrates was evaluated by UV-Vis spectra, which were recorded using Cary 50 Bio Spectrophotometer (Varian), with air as reference. Since the range of visible wavelength is from 390 nm to 700 nm,[41] the UV spectra were recorded from 300 nm to 800 nm. The thickness and refractive index of the BPMPC polymer layer on the glass substrates was measured by spectroscopic ellipsometry (M-2000V J. A. Woollam) with a white light source at three incident angles (65°, 70°, and 75°). The thickness of the modified layer was measured and calculated using a Cauchy layer model.

Antifogging Test. The antifogging property of various substrates was tested with both hot-vapor and freeze-warm methods. For the hot-vapor test, the coated glass slides, safety glasses or glasses were placed 5 cm above hot boiling water (~80° C.) and held for different time periods. Videos and photographs were recorded through the entire experiments. In addition, a more aggressive evaluation was conducted by placing the safety glasses in a freezer at −20° C. for 30 min, and quickly exposed to a warm humid environment (~20° C., 55% relative humidity).

Self-Cleaning Experiments. The self-cleaning properties of the BPMPC coating were evaluated using two approaches. The first method was dispensing tetradecane droplets (with disperse red 1 dye as a visual indicator) onto pure glass slides (hydrophilic), iBTS modified glass slides (hydrophobic), and BPMPC coated glass slides, followed by rinsing with DI water (with a toluidine blue dye indicator). Videos were recorded throughout the rinsing process, and photographs were taken after the water wash. Due to the low contrast of the tetradecane and background, the image was enhanced by Adobe Photoshop to achieve better resolution. The other method was trying to mimic practical contamination that occurs with common use in everyday life. The clean control and coated glass slides were contaminated with thumb prints (covered with tetradecane oil, followed by iron metal power dusting to give a clear visual of the fingerprint). Then the glass slides were immersed in DI water for 30 seconds to remove the contamination. The cleaning processes were recorded as well, and the final results were documented.

Chemical and Mechanical Durability Test. The chemical and mechanical robustness of BPMPC coating was challenged by household cleaning products and wiping operation. (1) Glass slides were sprayed with Windex (S. C. Johnson & Son), then wiped with KimWipe (VMR) harshly for several cycles to make sure there was no residue left. (2) Eyeglasses were cleaned using White Board Cleaner (Expo), followed with KimWipe wiping. After the cleaning procedure, the glass slides and eyeglasses were placed on top of the boiling water to check their antifogging properties. Videos and photographs were taken through the hot-vapor test.

Results and Discussion

Synthesis and surface analysis of zwitterionic copolymer coatings. According to previous work in our group, BPMPC copolymer was synthesized by radical polymerization with high yield, and the monomer ratio was confirmed by $^1$H NMR.[40] The kinetics study demonstrated rapid and efficient crosslink with C—H containing substrates and covalent bonds formed between the polymer and the substrate, as shown in Scheme 1.

Figure 8:
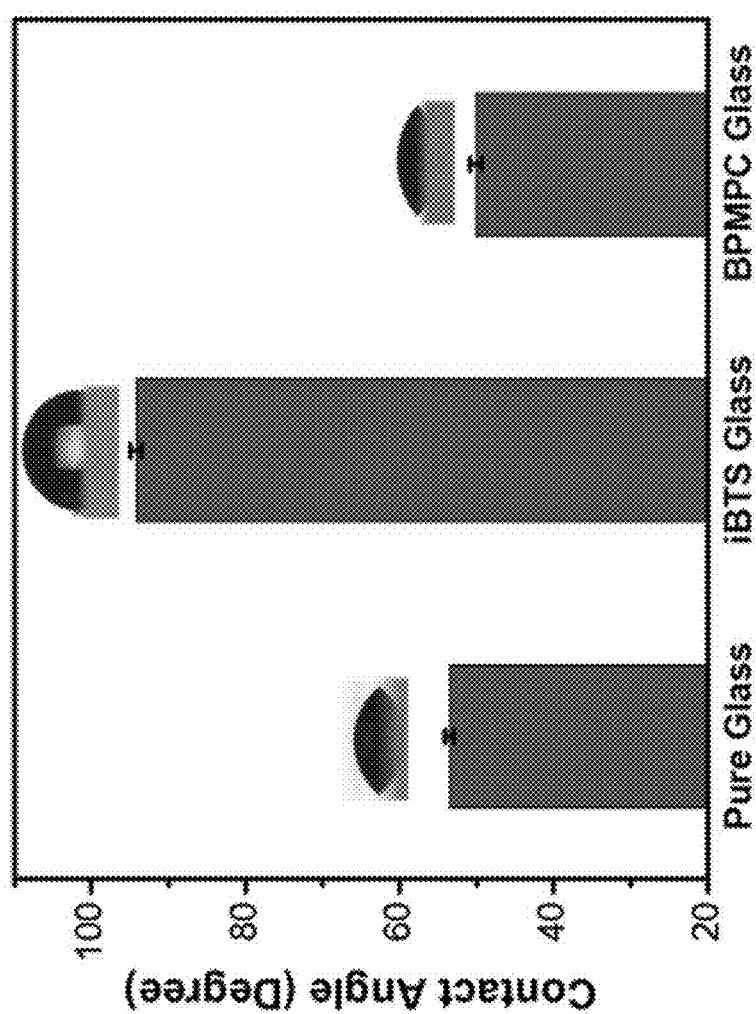
FIG. 8 shows the contact angle of pure glass, iBTS modified glass and BPMPC coated glass, and digital images of water droplet respectively (top).

To confirm the hydrophilicity of BPMPC coating, contact angles were measured and compared. The bare glass slide is hydrophilic with a static contact angle of 53°, while iBTS modified glass is a hydrophobic with a contact angle of 95°. After spray coating with BPMPC solution and UV irradiation, a significant decrease in contact angle was detected from 95° to 50° (FIG. 8). This contact angle is higher than other zwitterionic homopolymers reported in the literature because of the n-butylmethacrylate comonomer, which aids in substrate wetting and coating uniformity.

Transmittance. Transmittance is one of the critical factors for the practical application of the hydrophilic coating films, especially in the fields with high requirements on safety and appearance, such as auto windshields and window glass. FIGS. 1B-D shows the UV-vis spectra of bare glass and BPMPC modified glass with different coating thickness and the optical photographs of coated safety glasses and eyeglasses, where the left lens was coated, and the right masked as a control. From the UV-vis spectra shown in FIG. 1B, the transmittance of glass did not decrease due to the BPMPC coating, ranging from 50 nm to 300 nm, which indicate BPMPC coating do not interfere with the light transmission in the visible region. The BPMPC modified glass slides have slightly higher transmission than pure glass. This might occur due to the roughness of the surface and the refractive index of the polymer. The lower refractive index of the BPMPC would benefit the optical transmittance (refractive index as measured by spectroscopic ellipsometry of BPMPC and bare glass is 1.47 and 1.53 respectively).[14, 42] The roughness and surface topography of the coating on glass with different thickness has been examined by AFM (FIGS. 9A-9D). The BPMPC coatings with different thickness were smooth, as indicated by a typical root-mean-square (RMS) roughness of 2-3 nm over an area of 1×1 um$^2$, and the RMS roughness of bare glass was ~1 nm. The BPMPC top coating demonstrated similar roughness to bare glass, which would not affect the light transmittance in the visible spectra. However, the lower refractive index of BPMPC on glass promotes the destructive interference among the light rays reflected from the coating and substrate.[43] The light transmittance increases as a result of cancellation of reflection. In addition, from the optical photographs (FIGS. 1C and 1D), there was no visible difference between the modified safety glasses or eyeglasses when compared to the controls. The substrates with BPMPC coating exhibited the same excellent optical clarity.

Figure 2C:
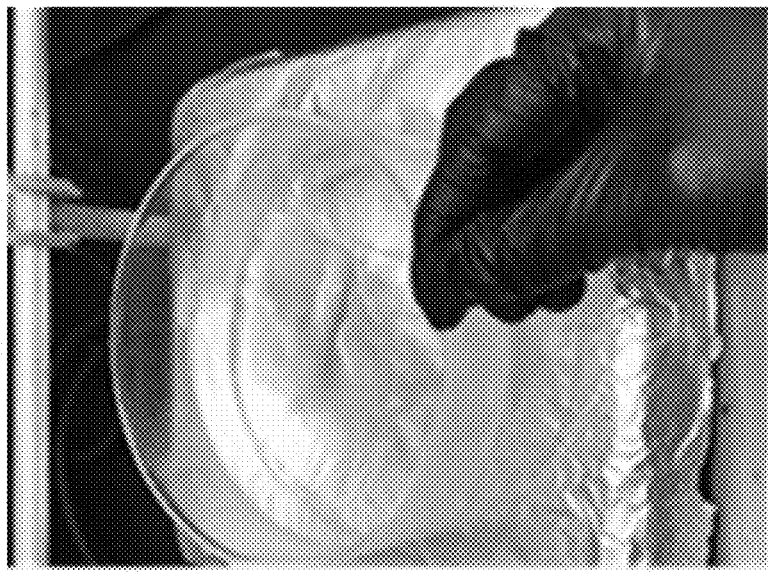
FIGS. 2A-2C are photographs of glass slides over hot steaming water.
Figure 2B:
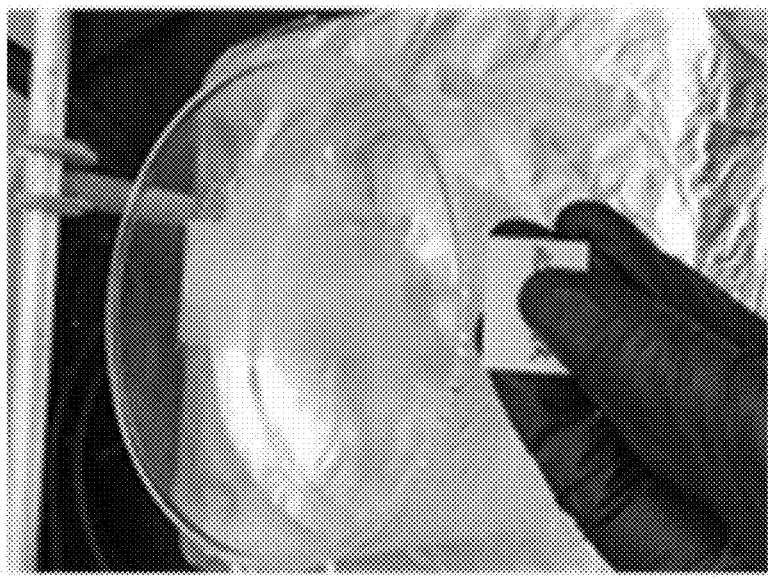
Figure 2A:
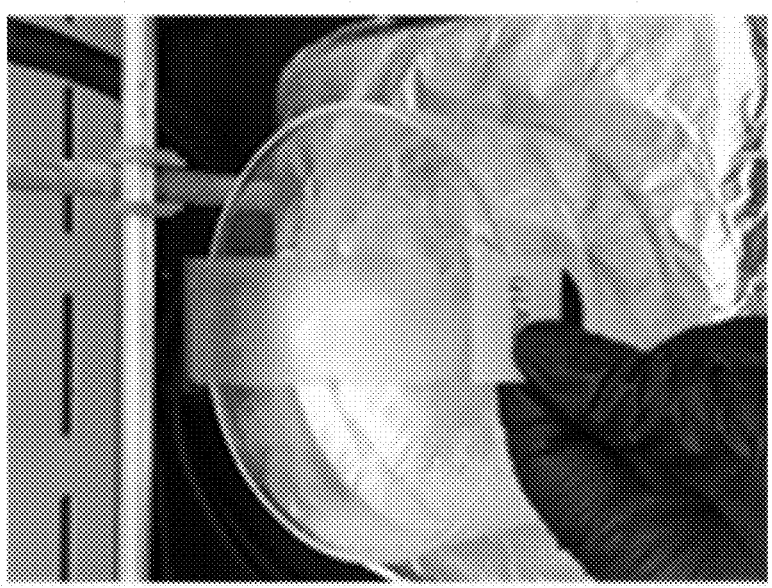
Figure 3B:
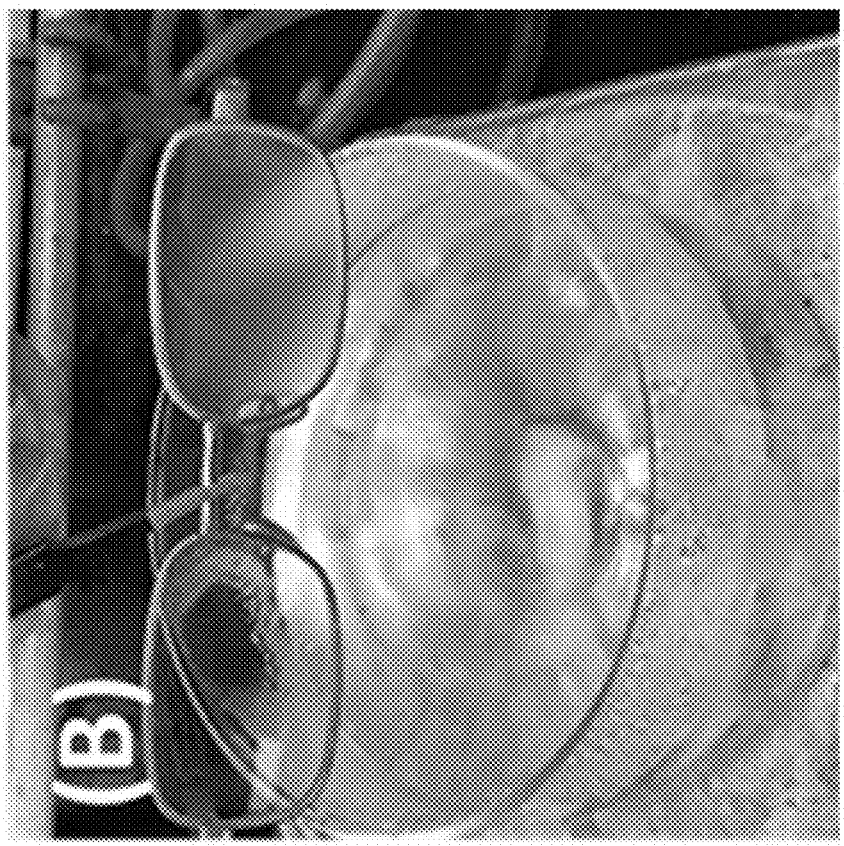
FIGS. 3A-3B are examples of eyewear with left BPMPC functionalized lens (unfogged) and right control lens (fogged) over hot steaming water.
Figure 3A:

Antifogging Properties. The antifogging performance of the BPMPC coatings were demonstrated by hot-vapor and freeze-warm tests. For the glass slides, it is observed from the photographs (FIGS. 2A-2C), that condensation formed instantly on both bare glass slide (hydrophilic) and iBTS treated glass slide (hydrophobic) when placed in close contact with the boiling water vapor. Wth the BPMPC functionalized substrate, no condensation was observed when the slide is approaching the boiling water and after a period of time. The BPMPC modified glass maintained excellent transparency during the experiment. For the safety glasses, the left side was spray-coated with BPMPC and cured by UV light, while the right side remained untreated. After placing the safety glasses above the boiling water, the control side (right) became opaque immediately due to the condensation, while the BPMPC modified side (left) maintained perfect clarity (FIG. 3A). Excess condensation can be observed toward the end of the videos due to the oversaturation of the substrate with excess condensate. The same test was conducted on the eyeglasses, and the same outcomes were observed (FIG. 3B). The excellent antifogging properties on these substrates and commercial samples confirmed that BPMPC could be applied to a wide variety of surfaces that are plastics or glass.

Figures 4A, 4B:
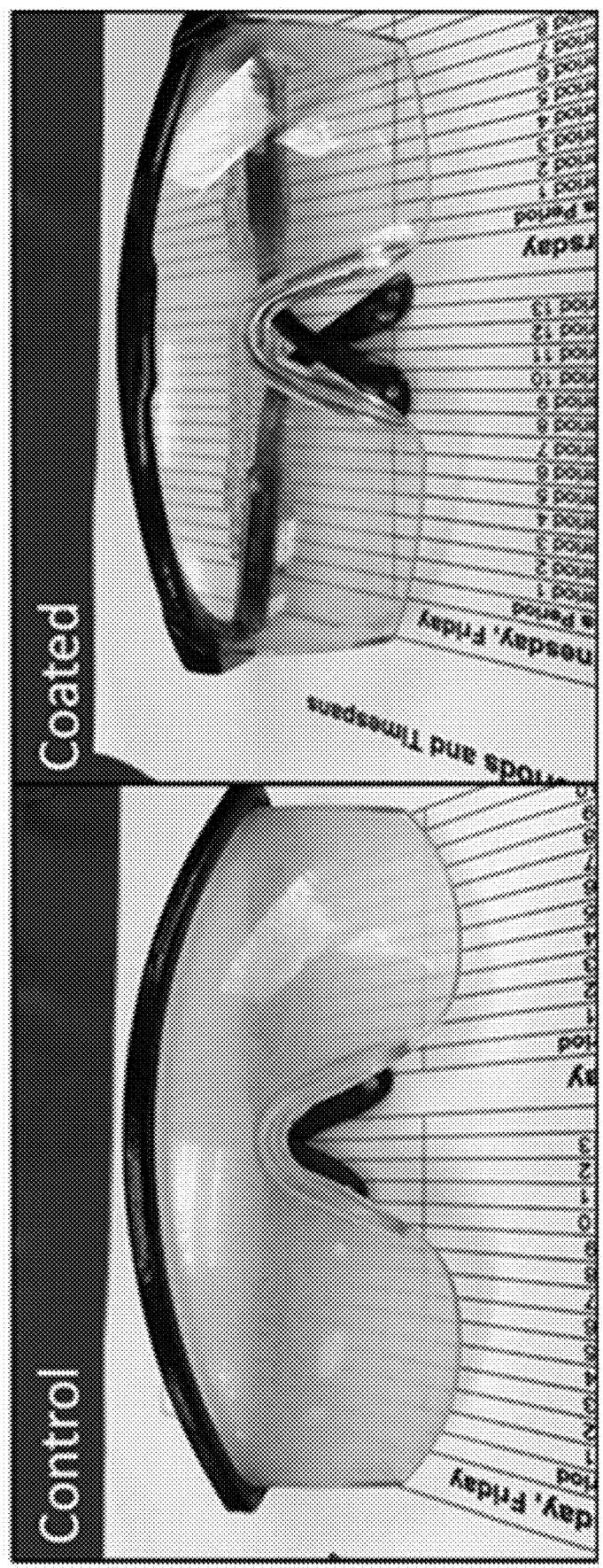
FIGS. 4A-4B are photographs of safety glasses exposed to ambient condition (temperature ~20° C., 50% relative humidity) right after being stored at −20° C. for 30 min.

In the freeze-warm test, the eyewear was stored in a freezer at −20° C. for 30 min before exposed to an ambient environment (~25° C.). Digital images were taken right after the sample was removed from the freezer. As shown in FIG. 4, the uncoated safety glasses immediately fogged completely, and light scattering is easily observed. On the other hand, the coated glasses display no loss in transparency or fogging/light scattering. The results of hot-vapor and freeze-warm tests indicated that BPMPC qualifies as an antifogging material even though it is a hydrophilic coating without a contact angle close to fully wetting. This phenomena has been observed previously in coatings of semi-interpenetrating polymer networks with antifogging properties.[44-45] Water droplets diffuse into the polymer coating, expanding the droplet basal area on the coating surface, which leads to the antifogging performance of BPMPC coating in spite of the high contact angle.

Self-cleaning test. Self-cleaning coatings are generally classified into two major categories: hydrophobic and hydrophilic. Both coatings remove oil and debris by the action of water. With hydrophobic coatings, water droplets can slide and roll off the surface removing oil and debris, with hydrophilic coatings, the water spreads over the surface, which forms a water layer on the substrates that carries the dirt and impurities away[46-47]. For BPMPC, it is anticipated that these coatings have the potential to be self-cleaning by the hydrophilic mechanism. Therefore, coated substrates were subjected to oil/grease and then immersed in water.

Figure 5A:
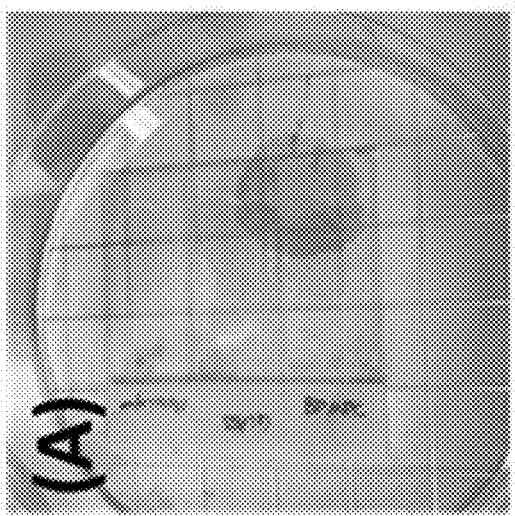
FIG. 5A shows oil droplets on iBTS modified glass (top), pure glass (middle), and BPMPC coated glass (bottom).
Figure 5B:
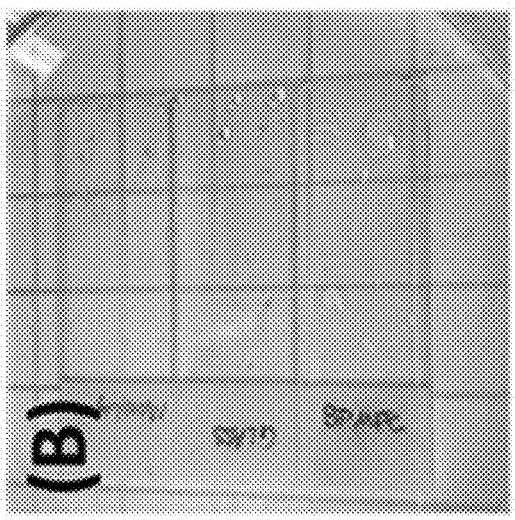
FIG. 5B shows the corresponding slides from FIG. 5A after water rinse.
Figure 5C:
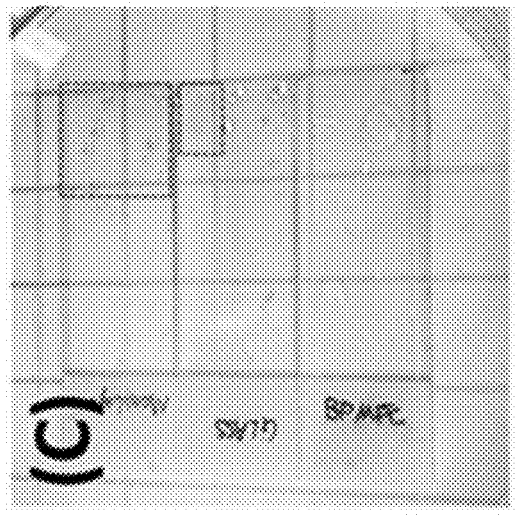
FIG. 5C is an enhanced image of FIG. 5B, with the oil residues enclosed in a red box.
Figure 5D:
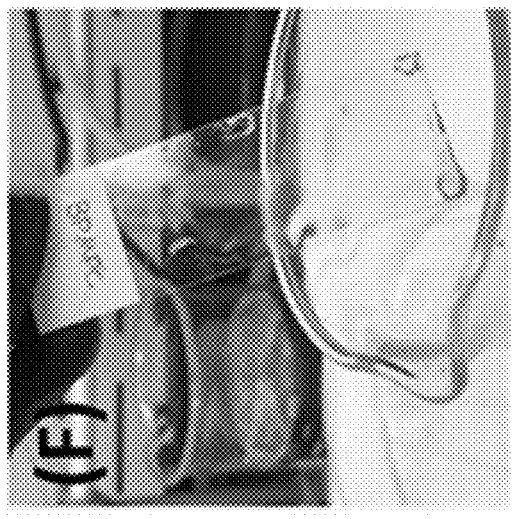
FIGS. 5D-5F show water formation on different surfaces during the washing process, iBTS modified glass, pure glass, and BPMPC functionalized glass respectively.
Figure 5E:
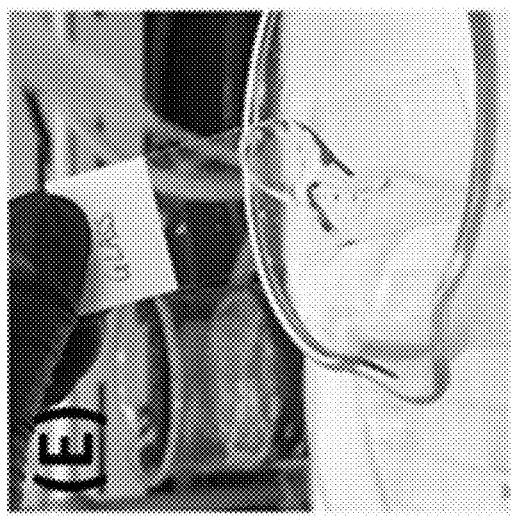
Figure 5F:
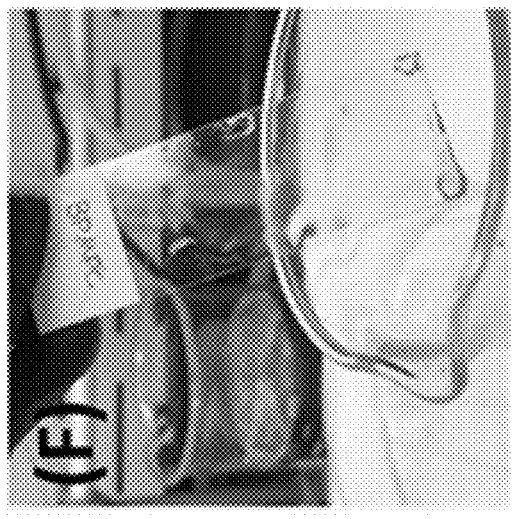

In the first series of experiments, the same amount of tetradecane (with dye) was placed on glass, iBTS modified glass, and BPMPC coated glass (FIG. 5A), then washed away by gently flowing 10 mL of $H_2O$ over the surface. Due to the low contrast between the oil and background in the resulting image (FIG. 5B), the image was enhanced using Photoshop, to better discriminate the obvious remaining residue (FIG. 5C), which remain on the iBTS modified (FIG. 5C, top slide) and control glass slide glass (FIG. 5C, middle slide). The gentle flow of water fails to remove the oil contamination on either. On the other hand, the BPMPC functionalized surface has no oil residue, only a droplet of water (dyed blue), which demonstrate the self-cleaning properties. To obtain a better understanding of the mechanism behind this phenomen, several images were extracted for each substrate (FIG. 5D-F) from a water rinsing video. Different states and amount of water were observed on these slides. On iBTS modified glass, only a few water droplets were observed (FIG. 5D), which indicate the oil layer below has strong affiliation with the surface and is not displaced by water. On the control glass slide, a water stream was observed (FIG. 5E) due to the hydrophilicity of bare glass, which implied higher affinity between the surface and water, but this was not sufficient to remove the oil entirely. However, on BPMPC functionalized slide, the water was able to spread out on the surface and form a uniform thin layer, which can then be used to separate oil from the surface and remove it completely (FIG. 5F). The strong affiliation between the BPMPC coating and water leads to this result.

Figure 6A:
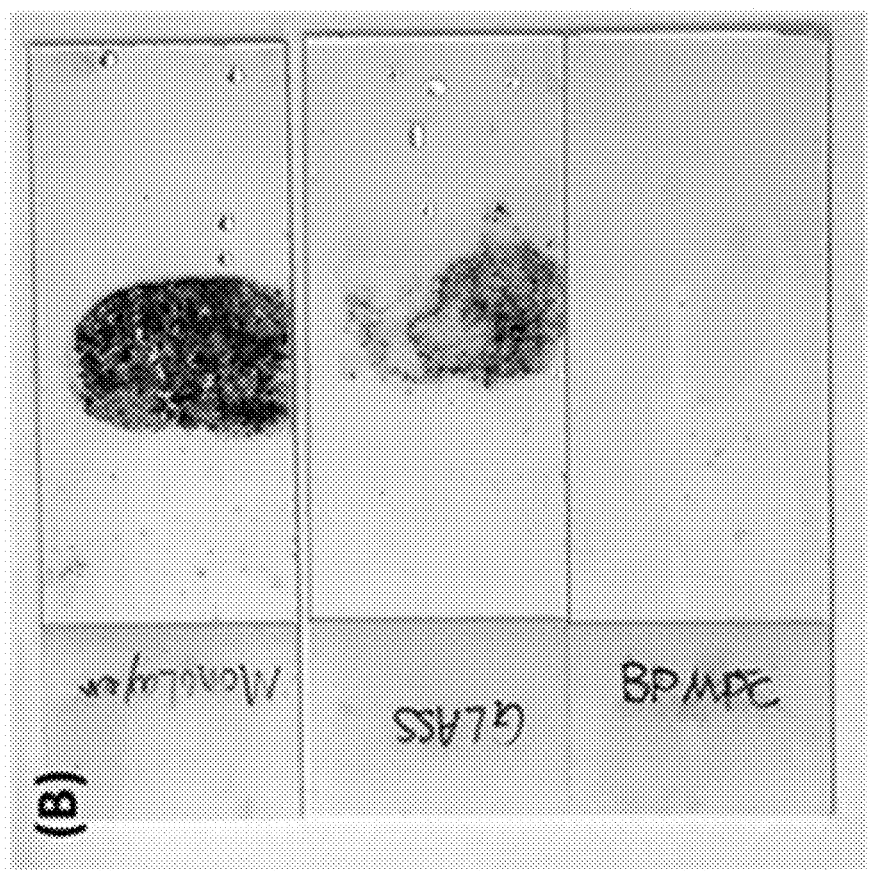
FIG. 6A shows example fingerprint images before water application on iBTS modified glass (top), pure glass (middle), and BPMPC coated glass (bottom).
Figure 6B:
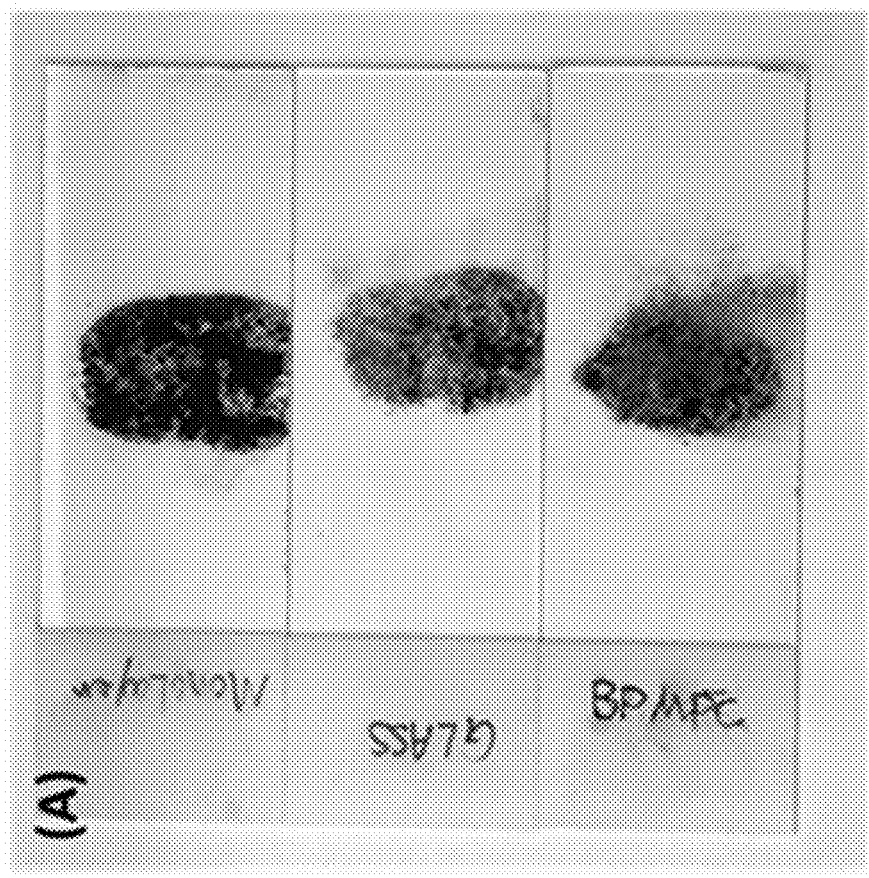
FIG. 6B shows the corresponding fingerprints after stirring in water solution for 30 sec.

In the second approach, an experiment was set up to investigate the removal of contaminations due to "greasy fingers". Water was used to remove the contaminations of greasy fingers debris (iron metal powder) attached. The fingerprints were dark and distinct on all slides (FIG. 6A) before cleaning. After stirring in water for 30 seconds, the fingerprint on the hydrophobic silane glass were maintained without any changes (FIG. 6B, top slide), which indicated that the greasy contamination remained. On the hydrophilic bare glass, a faint trace of the fingerprint was observed (FIG. 6B, middle slide), which implied the contamination was partially removed. On the contrary, no trace of fingerprint was observed (FIG. 6B, bottom slide) on BPMPC coated surface, which exhibited outstanding self-cleaning capability. The experimental result is consistent with the hydrophilicity and hydrophobicity of all substrates.

Figures 7A, 7B, 7C:
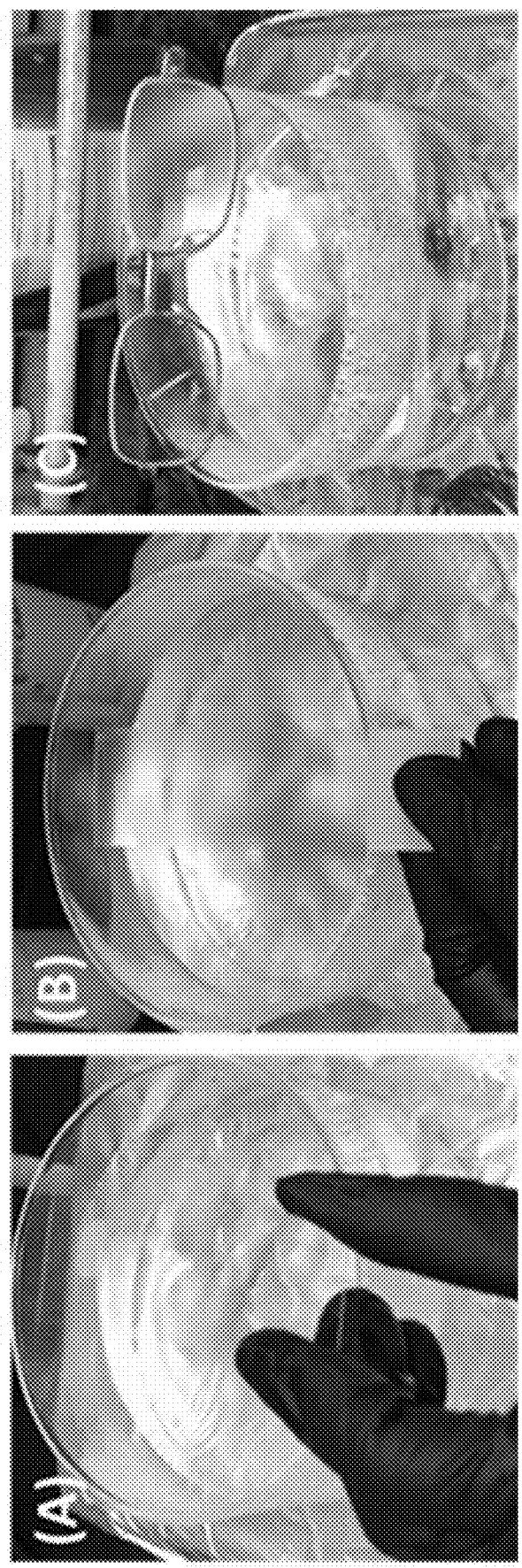
FIGS. 7A-7C are photographs of BPMPC coated glass slides after Windex wash on hot boiling water (FIG. 7A) without UV curing and (FIG. 7B) with UV curing.

Robust Properties. Durability is also an essential factor in practical application of antifogging materials. The coating should survive after common cleaning methods, including water, detergent wash, and abrasion with paper towels or tissue wipe. To confirm the robustness of BPMPC coating, an excess of glass cleaner (Windex®) was sprayed onto both sides of the polymer coated glass slide, then wiped harshly with a lab wipe (Kimwipe™). There is no difference in the appearance of the glass slide after cleaning. Then, the glass slide was placed on top of the hot boiling water and no condensation was observed (FIG. 7A). The same procedure was conducted on a BPMPC coated glass slide without UV cross-linking, and the condensation formed instantly when coming close to the hot-vapor (FIG. 7B), which indicates BPMPC has been completely removed because no covalent bonds were formed without UV irradiation.

Whiteboard Cleaner (Expo®) was used to examine the stability of BPMPC on eyeglasses. After spraying with enough amount of cleaner, and wiping thoroughly with a Kimwipe™, both sides of the eyeglasses demonstrated excellent optical clarity and were indistinguishable from each other. However, the uncoated side formed a visible fog layer quickly while the BPMPC functionalized side showed no condensation when exposed to hot water vapor (FIG. 7C).

CONCLUSIONS

In this research, a UV-curable antifogging and self-cleaning zwitterionic copolymer, BPMPC, was developed by a simple and straightforward radical polymerization. The polymer can be covalently grafted to various surfaces under mild UV treatment within a short period of time and does not affect the transparency of the substrates. More importantly, BPMPC coating demonstrate excellent antifogging and self-cleaning abilities on glass, eyeglasses and safety glasses. In addition, we have also challenged the BPMPC functionalized surface with household cleaning products, such as Windex® and Expo®. The surface maintained outstanding antifogging property which indicated the covalent bonds were not affected by cleaners. The facile and economical synthesis, the robust and versatile surface attachment, and the outstanding antifogging and self-cleaning abilities make it a competitive candidate for a wide array of potential domestic, medical and industrial coating application.

REFERENCES

1. Zhao, J.; Meyer, A.; Ma, L.; Wang, X. J.; Ming, W. H., Terpolymer-based SIPN Coating Wth Excellent Antifogging and Frost-resisting Properties. *RSC Adv.* 2015, 5, 102560-102566.
2. Chevallier, P.; Turgeon, S.; Sarra-Bournet, C.; Turcotte, R.; Laroche, G., Characterization of Multilayer Anti-Fog Coatings. *ACS Appl. Mater. Interfaces* 2011, 3, 750-758.
3. Petit, J.; Bonaccurso, E., General Frost Growth Mechanism on Solid Substrates with Different Stiffness. *Langmuir* 2014, 30, 1160-1168.

4. Wang, Y.; Li, T. Q.; Li, S. H.; Sun, J. Q., Antifogging and Frost-Resisting Polyelectrolyte Coatings Capable of Healing Scratches and Restoring Transparency. *Chem. Mater.* 2015, 27, 8058-8065.

5. Howarter, J. A.; Youngblood, J. P., Self-Cleaning and Next Generation Anti-Fog Surfaces and Coatings. *Macromol. Rapid Commun.* 2008, 29, 455-466.

6. Watanabe, T.; Nakajima, A.; Wang, R.; Minabe, M.; Koizumi, S.; Fujishima, A.; Hashimato, K., Photocatalytic Activity and Photoinduced Hydrophilicity of Titanium Dioxide Coated Glass. *2nd International Conference on Coatings on Glass, Iccg* 1999, 374-377.

7. Wang, R.; Hashimoto, K.; Fujishima, A.; Chikuni, M.; Kojima, E.; Kitamura, A.; Shimohigoshi, M.; Watanabe, T., Light-induced Amphiphilic Surfaces. *Nature* 1997, 388, 431-432.

8. Fujishima, A.; Zhang, X. T.; Tryk, D. A., $TiO_2$ Photocatalysis and Related Surface Phenomena. *Surf. Sci. Rep.* 2008, 63, 515-582.

9. Lai, Y. K.; Tang, Y. X.; Gong, J. J.; Gong, D. G.; Chi, L. F.; Lin, C. J.; Chen, Z., Transparent Superhydrophobic/Superhydrophilic $TiO_2$-based Coatings for Self-cleaning and Anti-fogging. *J. Mater. Chem.* 2012, 22, 7420-7426.

10. Zhang, L. B.; Li, Y.; Sun, J. Q.; Shen, J. C., Mechanically Stable Antireflection and Antifogging Coatings Fabricated by The Layer-by-layer Deposition Process and Postcalcination. *Langmuir* 2008, 24, 10851-10857.

11. de Leon, A.; Advincula, R. C., Reversible Superhydrophilicity and Superhydrophobicity on a Lotus-Leaf Pattern. *ACS Appl. Mater. Interfaces* 2014, 6, 22666-22672.

12. Raza, A.; Ding, B.; Zainab, G.; El-Newehy, M.; Al-Deyab, S. S.; Yu, J. Y., In situ Cross-linked Superwetting Nanofibrous Membranes for Ultrafast Oil-water Separation. *J. Mater. Chem. A* 2014, 2, 10137-10145.

13. Zhang, L.; Zhao, N.; Xu, J., Fabrication and Application of Superhydrophilic Surfaces: A Review. *J. Adhes. Sci. Technol.* 2014, 28, 769-790.

14. Liang, T.; Li, H.; Lai, X.; Su, X.; Zhang, L.; Zeng, X., A Facile Approach to UV-curable Super-hydrophilic Polyacrylate Coating Film Grafted on Glass Substrate. *J. Coat. Technol. Res.* 2016, 13, 1115-1121.

15. Ezzat, M.; Huang, C., Zwitterionic Polymerbrush Coatings with Excellent Anti-fog and Anti-frost Properties. *RSC Adv.* 2016, 6, 61695-61702.

16. Wolpers, A.; Vana, P., UV Light as External Switch and Boost of Molar-Mass Control in Iodine-Mediated Polymerization. *Macromolecules* 2014, 47, 954-963.

17. Ge, J. P.; Lee, H.; He, L.; Kim, J.; Lu, Z. D.; Kim, H.; Goebl, J.; Kwon, S.; Yin, Y. D., Magnetochromatic Microspheres: Rotating Photonic Crystals. *J. Am. Chem. Soc.* 2009, 131, 15687-15694.

18. Brown, P. S.; Atkinson, O. D.; Badyal, J. P., Ultrafast Oleophobic-hydrophilic Switching Surfaces for Antifogging, Self-cleaning, and Oil-water Separation. *ACS Appl. Mater. Interfaces* 2014, 6, 7504-11.

19. Hyomin Lee, M. L. A., Michael F. Rubner, Robert E. Cohen, Zwitter-Wettability and Antifogging Coatings with Frost-Resisting Capabilities. *ACS Nano* 2013, 7, 2172-2185.

20. Howarter, J. A.; Youngblood, J. P., Self-Cleaning and Anti-Fog Surfaces via Stimuli-Responsive Polymer Brushes. *Adv. Mater.* 2007, 19, 3838-3843.

21. Zhang, Z.; Chen, S. F.; Chang, Y.; Jiang, S. Y., Surface Grafted Sulfobetaine Polymers via Atom Transfer Radical Polymerization as Superlow Fouling Coatings. *J. Phys. Chem. B* 2006, 110, 10799-10804.

22. Liu, P. S.; Domingue, E.; Ayers, D. C.; Song, J., Modification of $Ti_6Al_4V$ Substrates with Well-defined Zwitterionic Polysulfobetaine Brushes for Improved Surface Mineralization. *ACS Appl. Mater. Interfaces* 2014, 6, 7141-7152.

23. Singha, P.; Locklin, J.; Handa, H., A Review of The Recent Advances in Antimicrobial Coatings for Urinary Catheters. *Acta Biomater* 2017, 50, 20-40.

24. Li, C.; Li, X.; Tao, C.; Ren, L.; Zhao, Y.; Bai, S.; Yuan, X., Amphiphilic Antifogging/Anti-Icing Coatings Containing POSS-PDMAEMA-b-PSBMA. *ACS Appl. Mater. Interfaces* 2017, 9, 22959-22969.

25. Lin, X.; Fukazawa, K.; Ishihara, K., Photoreactive Polymers Bearing a Zwitterionic Phosphorylcholine Group for Surface Modification of Biomaterials. *ACS Appl. Mater. Interfaces* 2015, 7, 17489-98.

26. Ercole, F.; Davis, T. P.; Evans, R. A., Photo-responsive Systems and Biomaterials: Photochromic Polymers, Light-triggered Self-assembly, Surface Modification, Fluorescence Modulation and Beyond. *Polym. Chem.* 2010, 1, 37-54.

27. Dorman, G.; Prestwich, G. D., Benzophenone Photophores in Biochemistry. *Biochemistry* 1994, 33, 5661-5673.

28. Higuchi, H.; Yamashita, T.; Horie, K.; Mita, I., Photo-Cross-Linking Reaction of Benzophenone-Containing Polyimide and Its Model Compounds. *Chem. Mater.* 1991, 3, 188-194.

29. Toomey, R.; Freidank, D.; Ruhe, J., Swelling behavior of thin, surface-attached polymer networks. *Macromolecules* 2004, 37, 882-887.

30. Pahnke, J.; Ruhe, J., Attachment of Polymer Films to Aluminium Surfaces by Photochemically Active Monolayers of Phosphonic Acids. *Macromol. Rapid Commun.* 2004, 25, 1396-1401.

31. Shen, W. W.; Boxer, S. G.; Knoll, W.; Frank, C. W., Polymer-supported Lipid Bilayers on Benzophenone-modified Substrates. *Biomacromolecules* 2001, 2, 70-79.

32. Virkar, A.; Ling, M. M.; Locklin, J.; Bao, Z., Oligothiophene Based Organic Semiconductors with Cross-linkable Benzophenone Moieties. *Synth. Met.* 2008, 158, 958-963.

33. Samuel, J. D. J. S.; Brenner, T.; Prucker, O.; Grumann, M.; Ducree, J.; Zengerle, R.; Ruhe, J., Tailormade Microfluidic Devices Through Photochemical Surface Modification. *Macromol. Chem. Phys.* 2010, 211, 195-203.

34. Hu, S. W.; Ren, X. Q.; Bachman, M.; Sims, C. E.; Li, G. P.; Allbritton, N. L., Surface-directed, Graft Polymerization within Microfluidic Channels. *Anal. Chem.* 2004, 76, 1865-1870.

35. Prucker, O.; Brandstetter, T.; Ruhe, J., Surface-attached Hydrogel Coatings via C,H-insertion Crosslinking for Biomedical and Bioanalytical Applications (Review). *Biointerphases* 2018, 13.

36. Abu-Rabeah, K.; Atias, D.; Herrmann, S.; Frenkel, J.; Tavor, D.; Cosnier, S.; Marks, R. S., Characterization of Electrogenerated Polypyrrole-Benzophenone Films Coated on Poly(pyrrole-methyl metacrylate) Optic-Conductive Fibers. *Langmuir* 2009, 25, 10384-10389.

37. Brandstetter, T.; Bohmer, S.; Prucker, O.; Bisse, E.; zur Hausen, A.; Alt-Morbe, J.; Ruhe, J., A Polymer-based DNA Biochip Platform for Human Papilloma Virus Genotyping. *J. Virol. Methods* 2010, 163, 40-48.

38. Yatvin, J.; Gao, J.; Locklin, J., Durable Defense: Robust and Varied Attachment of Non-leaching Poly"-onium" Bactericidal Coatings to Reactive and Inert Surfaces. *Chem. Commun.* 2014, 50, 9433-9442.

39. Gao, J.; Martin, A.; Yatvin, J.; White, E.; Locklin, J., Permanently Grafted Icephobic Nanocomposites with High Abrasion Resistance. *J. Mater. Chem. A* 2016, 4, 11719-11728.
40. Liu, Q. H.; Singha, P.; Handa, H.; Locklin, J., Covalent Grafting of Antifouling Phosphorylcholine-Based Copolymers with Antimicrobial Nitric Oxide Releasing Polymers to Enhance Infection-Resistant Properties of Medical Device Coatings. *Langmuir* 2017, 33, 13105-13113.
41. Starr, C.; Evers, C. A.; Starr, L., *Biology: Concepts and Applications*. Thomson Brooks: 2006.
42. Stephens, E. R.; Rodney, W. S., Refractive Indices of Five Selected Optical Glasses. *J. Res. Natl. Bur. Stand.* 1954, 52, 303-304.
43. Raut, H. K.; Ganesh, V. A.; Nair, A. S.; Ramakrishna, S., Anti-reflective Coatings: A Critical, In-depth Review. *Energ Environ. Sci.* 2011, 4, 3779-3804.
44. Zhao, J.; Ma, L.; Millians, W.; Wu, T. E. H.; Ming, W. H., Dual-Functional Antifogging/Antimicrobial Polymer Coating. *ACS Appl. Mater. Inter.* 2016, 8, 8737-8742.
45. Zhang, T.; Yu, Q. Y.; Wang, J. J.; Wu, T., Design and Fabrication of a Renewable and Highly Transparent Multilayer Coating on Poly(lactic acid) Film Capable of UV-Shielding and Antifogging. *Ind. Eng. Chem. Res.* 2018, 57, 4577-4584
46. Liu, K. S.; Yao, X.; Jiang, L., Recent Developments in Bio-inspired Special Wettability. *Chem. Soc. Rev.* 2010, 39, 3240-3255.
47. Ganesh, V. A.; Raut, H. K.; Nair, A. S.; Ramakrishna, S., A Review on Self-cleaning Coatings. *J. Mater. Chem.* 2011, 21, 16304-16322.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. An article, comprising:
   a transparent surface, wherein a transparent film is disposed on the surface, wherein the film gives the surface an anti-fogging characteristic and a hydrophilic characteristic;
   wherein the film comprises a polymer having the following structure:

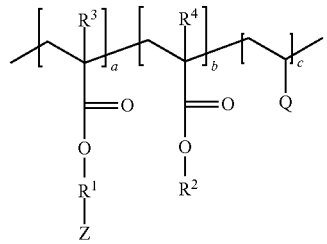

where each occurrence of Z is a zwitterionic moiety; where Q is selected from a photo cross-linkable moiety, a cross-linked photo cross-linkable moiety, or a combination of the photo cross-linkable moiety and the cross-linked photo cross-linkable moiety are present in the polymer, where a first portion of Q is the photo cross-linkable moiety and a second portion of Q is the cross-linked photo cross-linkable moiety, wherein the first portion is 0% to less than 100%, wherein the second portion is greater than 0% and up to 100%; where each occurrence of $R^1$ is independently a covalent bond or a linear or branched, substituted or unsubstituted alkyl diradical having from 1 to 12 carbon atoms; where each occurrence of $R^2$, $R^3$, and $R^4$ is independently a linear or branched, substituted or unsubstituted alkyl having from 1 to 12 carbon atoms; and where a, b, and c are real numbers such that $0<a<1$, $0\leq b<1$, $0<c<1$, and $a+b+c=1$;

wherein the zwitterionic moiety is selected from 2-methacryloyloxyethyl phosphorylcholine (MPC), phosphate betaine, carboxybetaine, and sulfobetaine; and wherein the polymer is covalently attached to the surface through the second portion of the cross-linked photo cross-linkable moiety.

2. The article of claim 1, wherein the photo cross-linkable moiety is selected from one or more of an aryl ketone, an aryl azide group, or a diazirine group.

3. The article of claim 1, wherein the polymer is selected from one or more of 30% MPC polymer, 50% MPC polymer, 70% MPC polymer, or 90% MPC polymer.

4. The article of claim 1, wherein the article is selected from eyeglasses, sunglasses, goggles, a vehicle, a camera, a screen, a weapon, lab equipment, a mirror, a window, and glassware.

5. The article of claim 1, wherein the surface is selected from an optical lens, a windshield, a sight, a scope, a mirror, a window, and glassware.

6. An article, comprising:
   a transparent surface, wherein a transparent film is disposed on the surface, wherein the film gives the surface an anti-fogging characteristic;
   wherein the film comprises a zwitterionic polymer having the following structure:

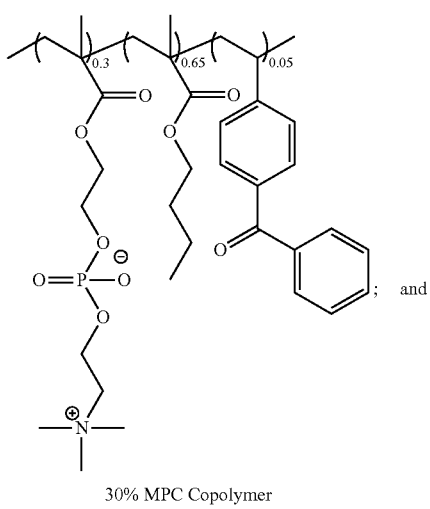

30% MPC Copolymer wherein the polymer is covalently attached to the surface through a cross-linked portion of the photo cross-linkable moiety.

7. An article, comprising:

a transparent surface, wherein a transparent film is disposed on the surface, wherein the film gives the surface an anti-fogging characteristic;

wherein the film comprises a zwitterionic polymer having the following structure:

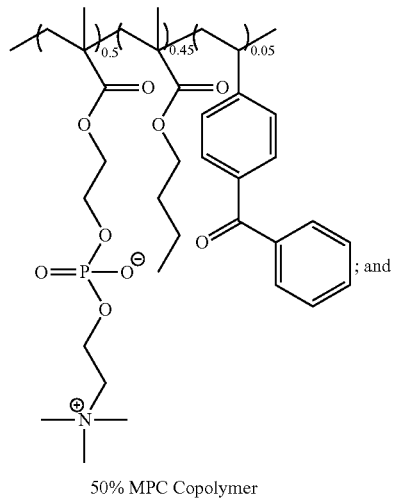

50% MPC Copolymer wherein the polymer is covalently attached to the surface through a cross-linked portion of the photo cross-linkable moiety.

8. An article, comprising:

a transparent surface, wherein a transparent film is disposed on the surface, wherein the film gives the surface an anti-fogging characteristic;

wherein the film comprises a zwitterionic polymer having the following structure:

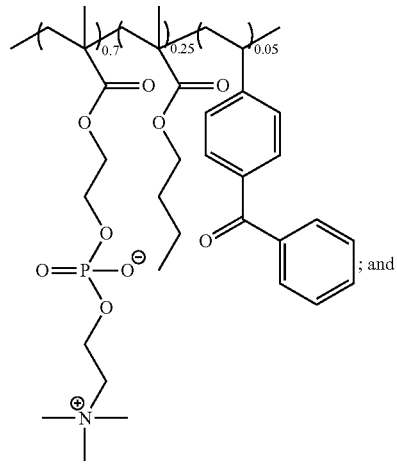

70% MPC Copolymer wherein the polymer is covalently attached to the surface through a cross-linked portion of the photo cross-linkable moiety.

9. An article, comprising:

a transparent surface, wherein a transparent film is disposed on the surface, wherein the film gives the surface an anti-fogging characteristic;

wherein the film comprises a zwitterionic polymer having the following structure:

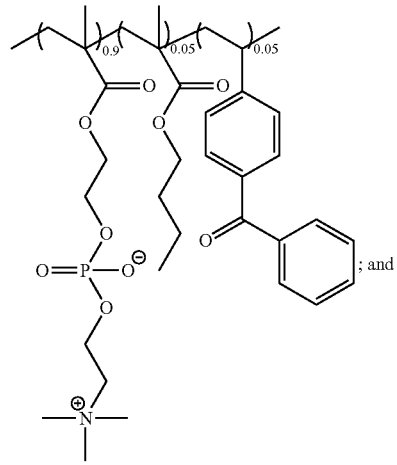

90% MPC Copolymer wherein the polymer is covalently attached to the surface through a cross-linked portion of the photo cross-linkable moiety.

* * * * *